United States Patent
Zhang et al.

(10) Patent No.: US 9,172,487 B2
(45) Date of Patent: Oct. 27, 2015

(54) METHOD FOR ALLOCATING RESOURCE OF WIRELESS COMMUNICATION AND CORRESPONDING USER DEVICE AND BASE STATION

(71) Applicant: FUJITSU LIMITED, Kawasaki-shi, Kanagawa (JP)

(72) Inventors: Lei Zhang, Beijing (CN); Jiangfeng Ji, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 53 days.

(21) Appl. No.: 13/759,614

(22) Filed: Feb. 5, 2013

(65) Prior Publication Data

US 2013/0148552 A1 Jun. 13, 2013

Related U.S. Application Data

(63) Continuation of application No. PCT/CN2010/077410, filed on Sep. 28, 2010.

(51) Int. Cl.
*H04W 72/04* (2009.01)
*H04J 3/16* (2006.01)
(Continued)

(52) U.S. Cl.
CPC ............ *H04J 3/1605* (2013.01); *H04L 5/1484* (2013.01); *H04W 28/048* (2013.01);
(Continued)

(58) Field of Classification Search
CPC ..... H04W 36/00; H04W 72/12; H04W 72/04; H04W 72/00; H04W 28/048; H04W 72/0406; H04W 72/0446; H04W 72/1215; H04W 72/1278; H04W 28/18; H04W 52/0216; H04W 84/20; H04W 88/06; H04W 72/0493; H04W 72/0486; H04L 5/0037; H04L 5/0023; H04L 5/1484; H04L 5/0007; H04J 3/1605; G01S 19/03; G01S 19/21; H04B 1/406; H04B 7/2656
USPC ......... 370/276, 280, 294, 328, 329, 330, 350, 370/336, 338, 444, 443, 345; 455/41.1, 455/41.2, 552.1, 553.1, 560, 502
See application file for complete search history.

(56) References Cited

U.S. PATENT DOCUMENTS 6,650,630 B1 * 11/2003 Haartsen ....................... 370/345
6,956,834 B2 * 10/2005 Stanwood et al. ............ 370/329
(Continued)

FOREIGN PATENT DOCUMENTS

CN 101079777 A 11/2007
CN 101485118 7/2009
(Continued)

OTHER PUBLICATIONS

International search report issued for corresponding International Patent Application No. PCT/CN2010/077410, mailed Jun. 30, 2011.

*Primary Examiner* — Edan Orgad
*Assistant Examiner* — Ivan O Latorre
(74) *Attorney, Agent, or Firm* — Myers Wolin, LLC

(57) ABSTRACT

A base station communicates with a user device in the mode of time division duplexing based on the orthogonal frequency division multiplexing scheme. The physics transmission resource used for communicating between the station and device is divided into a plurality of continuous frames in the time domain, each containing a plurality of sub-frames. The base station can include: a period determination device, for determining the period of the current frame, composed of a predetermined number of frames in a plurality of frames; a judgment device, for determining whether each sub-frame in the current frame is marked as the first or second state; a communication control device, for permitting the base station to communicate with the user device on the sub-frame when it is in the first state, forbidding communication only concerned with the user device performed by the base station on the sub-frame when it is in the second state.

32 Claims, 11 Drawing Sheets

(51) Int. Cl.
  *H04W 72/12* (2009.01)
  *H04W 28/04* (2009.01)
  *H04L 5/14* (2006.01)
  *H04B 7/26* (2006.01)
  *H04L 5/00* (2006.01)

(52) U.S. Cl.
  CPC ...... *H04W72/0486* (2013.01); *H04W 72/0493* (2013.01); *H04W 72/1215* (2013.01); *H04W 72/1278* (2013.01); *H04B 7/2656* (2013.01); *H04L 5/0007* (2013.01); *H04W 72/0446* (2013.01)

(56) References Cited

U.S. PATENT DOCUMENTS

| | | | |
|---|---|---|---|
| 2005/0122999 A1* | 6/2005 | Scherzer et al. | 370/480 |
| 2008/0247367 A1 | 10/2008 | Guo et al. | |
| 2008/0247445 A1 | 10/2008 | Guo et al. | |
| 2009/0129367 A1* | 5/2009 | Bitran | 370/350 |
| 2010/0046496 A1* | 2/2010 | Hall | 370/345 |
| 2010/0075600 A1* | 3/2010 | Haartsen | 455/41.2 |
| 2010/0135256 A1* | 6/2010 | Lee et al. | 370/336 |
| 2010/0144340 A1* | 6/2010 | Sudak | 455/426.1 |
| 2010/0246456 A1* | 9/2010 | Suo et al. | 370/280 |
| 2010/0265856 A1* | 10/2010 | Yang | 370/281 |
| 2011/0205986 A1* | 8/2011 | Medapalli | 370/329 |
| 2012/0120854 A1* | 5/2012 | Zhang et al. | 370/280 |
| 2013/0225085 A1 | 8/2013 | Grushkevich et al. | |

FOREIGN PATENT DOCUMENTS

| | | | | |
|---|---|---|---|---|
| CN | 101622897 A | | 1/2010 | |
| CN | 101682540 A | | 3/2010 | |
| CN | 101743735 A | | 6/2010 | |
| WO | WO 2007/008981 | * | 1/2007 | ............ H04L 12/28 |
| WO | 2009/062115 | | 5/2009 | |
| WO | 2009/102181 | | 8/2009 | |

* cited by examiner

| | | subframe number | | | | | | | | | |
|---|---|---|---|---|---|---|---|---|---|---|---|
| | | 0 | 1 | 2 | 3 | 4 | 5 | 6 | 7 | 8 | 9 |
| uplink\downlink frame configuration 0 | | D | S | U | U | U | D | S | U | U | U |
| | | 0 | 1 | 2 | 3 | 4 | 5 | 6 | 7 | 8 | 9 |
| uplink\downlink frame configuration 1 | | D | S | U | U | D | D | S | U | U | D |
| | | 0 | 1 | 2 | 3 | 4 | 5 | 6 | 7 | 8 | 9 |
| uplink\downlink frame configuration 2 | | D | S | U | D | D | D | S | U | D | D |
| | | 0 | 1 | 2 | 3 | 4 | 5 | 6 | 7 | 8 | 9 |
| uplink\downlink frame configuration 3 | | D | S | U | U | U | D | D | D | D | D |
| | | 0 | 1 | 2 | 3 | 4 | 5 | 6 | 7 | 8 | 9 |
| uplink\downlink frame configuration 4 | | D | S | U | U | D | D | D | D | D | D |
| | | 0 | 1 | 2 | 3 | 4 | 5 | 6 | 7 | 8 | 9 |
| uplink\downlink frame configuration 5 | | D | S | U | D | D | D | D | D | D | D |
| | | 0 | 1 | 2 | 3 | 4 | 5 | 6 | 7 | 8 | 9 |
| uplink\downlink frame configuration 6 | | D | S | U | U | U | D | S | U | U | D |

Fig 4

| | | frame n | | | | | | | | | |
|---|---|---|---|---|---|---|---|---|---|---|---|
| | | 0 | 1 | 2 | 3 | 4 | 5 | 6 | 7 | 8 | 9 |
| set 1 | | D | S | U | U | U | D | S | U | U | U |
| | | 0 | 1 | 2 | 3 | 4 | 5 | 6 | 7 | 8 | 9 |
| set 2 | | D | S | U | U | U | D | S | U | U | U |
| | | 0 | 1 | 2 | 3 | 4 | 5 | 6 | 7 | 8 | 9 |
| set 3 | | D | S | U | U | U | D | S | U | U | U |
| | | 0 | 1 | 2 | 3 | 4 | 5 | 6 | 7 | 8 | 9 |
| set 4 | | D | S | U | U | U | D | S | U | U | U |

Fig 5

|  | frame n | | | | | | | | | |
|---|---|---|---|---|---|---|---|---|---|---|
|  | 0 | 1 | 2 | 3 | 4 | 5 | 6 | 7 | 8 | 9 |
| set 1 | D | S | U | U | D | D | S | U | U | D |
|  | 0 | 1 | 2 | 3 | 4 | 5 | 6 | 7 | 8 | 9 |
| set 2 | D | S | U | U | D | D | S | U | U | D |
|  | 0 | 1 | 2 | 3 | 4 | 5 | 6 | 7 | 8 | 9 |
| set 3 | D | S | U | U | D | D | S | U | U | D |
|  | 0 | 1 | 2 | 3 | 4 | 5 | 6 | 7 | 8 | 9 |
| set 4 | D | S | U | U | D | D | S | U | U | D |
|  | 0 | 1 | 2 | 3 | 4 | 5 | 6 | 7 | 8 | 9 |
| set 5 | D | S | U | U | D | D | S | U | U | D |
|  | 0 | 1 | 2 | 3 | 4 | 5 | 6 | 7 | 8 | 9 |
| set 6 | D | S | U | U | D | D | S | U | U | D |

Fig 6

|  | frame n | | | | | | | | | |
|---|---|---|---|---|---|---|---|---|---|---|
|  | 0 | 1 | 2 | 3 | 4 | 5 | 6 | 7 | 8 | 9 |
| set 1 | D | S | U | D | D | D | S | U | D | D |
|  | 0 | 1 | 2 | 3 | 4 | 5 | 6 | 7 | 8 | 9 |
| set 2 | D | S | U | D | D | D | S | U | D | D |
|  | 0 | 1 | 2 | 3 | 4 | 5 | 6 | 7 | 8 | 9 |
| set 3 | D | S | U | D | D | D | S | U | D | D |
|  | 0 | 1 | 2 | 3 | 4 | 5 | 6 | 7 | 8 | 9 |
| set 4 | D | S | U | D | D | D | S | U | D | D |
|  | 0 | 1 | 2 | 3 | 4 | 5 | 6 | 7 | 8 | 9 |
| set 5 | D | S | U | D | D | D | S | U | D | D |
|  | 0 | 1 | 2 | 3 | 4 | 5 | 6 | 7 | 8 | 9 |
| set 6 | D | S | U | D | D | D | S | U | D | D |
|  | 0 | 1 | 2 | 3 | 4 | 5 | 6 | 7 | 8 | 9 |
| set 7 | D | S | U | D | D | D | S | U | D | D |
|  | 0 | 1 | 2 | 3 | 4 | 5 | 6 | 7 | 8 | 9 |
| set 8 | D | S | U | D | D | D | S | U | D | D |

Fig 7

| | frame n | | | | | | | | | |
|---|---|---|---|---|---|---|---|---|---|---|
| | 0 | 1 | 2 | 3 | 4 | 5 | 6 | 7 | 8 | 9 |
| set 1 | D | S | U | U | U | D | D | D | D | D |
| | 0 | 1 | 2 | 3 | 4 | 5 | 6 | 7 | 8 | 9 |
| set 2 | D | S | U | U | U | D | D | D | D | D |
| | 0 | 1 | 2 | 3 | 4 | 5 | 6 | 7 | 8 | 9 |
| set 3 | D | S | U | U | U | D | D | D | D | D |
| | 0 | 1 | 2 | 3 | 4 | 5 | 6 | 7 | 8 | 9 |
| set 4 | D | S | U | U | U | D | D | D | D | D |
| | 0 | 1 | 2 | 3 | 4 | 5 | 6 | 7 | 8 | 9 |
| set 5 | D | S | U | U | U | D | D | D | D | D |
| | 0 | 1 | 2 | 3 | 4 | 5 | 6 | 7 | 8 | 9 |
| set 6 | D | S | U | U | U | D | D | D | D | D |
| | 0 | 1 | 2 | 3 | 4 | 5 | 6 | 7 | 8 | 9 |
| set 7 | D | S | U | U | U | D | D | D | D | D |
| | 0 | 1 | 2 | 3 | 4 | 5 | 6 | 7 | 8 | 9 |
| set 8 | D | S | U | U | U | D | D | D | D | D |
| | 0 | 1 | 2 | 3 | 4 | 5 | 6 | 7 | 8 | 9 |
| set 9 | D | S | U | U | U | D | D | D | D | D |

Fig 8

| | frame n | | | | | | | | | |
|---|---|---|---|---|---|---|---|---|---|---|
| | 0 | 1 | 2 | 3 | 4 | 5 | 6 | 7 | 8 | 9 |
| set 1 | D | S | U | U | D | D | D | D | D | D |
| | 0 | 1 | 2 | 3 | 4 | 5 | 6 | 7 | 8 | 9 |
| set 2 | D | S | U | U | D | D | D | D | D | D |
| | 0 | 1 | 2 | 3 | 4 | 5 | 6 | 7 | 8 | 9 |
| set 3 | D | S | U | U | D | D | D | D | D | D |
| | 0 | 1 | 2 | 3 | 4 | 5 | 6 | 7 | 8 | 9 |
| set 4 | D | S | U | U | D | D | D | D | D | D |
| | 0 | 1 | 2 | 3 | 4 | 5 | 6 | 7 | 8 | 9 |
| set 5 | D | S | U | U | D | D | D | D | D | D |
| | 0 | 1 | 2 | 3 | 4 | 5 | 6 | 7 | 8 | 9 |
| set 6 | D | S | U | U | D | D | D | D | D | D |
| | 0 | 1 | 2 | 3 | 4 | 5 | 6 | 7 | 8 | 9 |
| set 7 | D | S | U | U | D | D | D | D | D | D |
| | 0 | 1 | 2 | 3 | 4 | 5 | 6 | 7 | 8 | 9 |
| set 8 | D | S | U | U | D | D | D | D | D | D |
| | 0 | 1 | 2 | 3 | 4 | 5 | 6 | 7 | 8 | 9 |
| set 9 | D | S | U | U | D | D | D | D | D | D |

Fig 9

|  | frame n | | | | | | | | | |
|---|---|---|---|---|---|---|---|---|---|---|
|  | 0 | 1 | 2 | 3 | 4 | 5 | 6 | 7 | 8 | 9 |
| set 1 | D | S | U | D | D | D | D | D | D | D |
|  | 0 | 1 | 2 | 3 | 4 | 5 | 6 | 7 | 8 | 9 |
| set 2 | D | S | U | D | D | D | D | D | D | D |
|  | 0 | 1 | 2 | 3 | 4 | 5 | 6 | 7 | 8 | 9 |
| set 3 | D | S | U | D | D | D | D | D | D | D |
|  | 0 | 1 | 2 | 3 | 4 | 5 | 6 | 7 | 8 | 9 |
| set 4 | D | S | U | D | D | D | D | D | D | D |
|  | 0 | 1 | 2 | 3 | 4 | 5 | 6 | 7 | 8 | 9 |
| set 5 | D | S | U | D | D | D | D | D | D | D |
|  | 0 | 1 | 2 | 3 | 4 | 5 | 6 | 7 | 8 | 9 |
| set 6 | D | S | U | D | D | D | D | D | D | D |
|  | 0 | 1 | 2 | 3 | 4 | 5 | 6 | 7 | 8 | 9 |
| set 7 | D | S | U | D | D | D | D | D | D | D |
|  | 0 | 1 | 2 | 3 | 4 | 5 | 6 | 7 | 8 | 9 |
| set 8 | D | S | U | D | D | D | D | D | D | D |
|  | 0 | 1 | 2 | 3 | 4 | 5 | 6 | 7 | 8 | 9 |
| set 9 | D | S | U | D | D | D | D | D | D | D |

|  | frame 0 | | | | | | | | | | frame 1 | | | | | | | | | | frame 2 | | | | | | | | | |
|---|---|---|---|---|---|---|---|---|---|---|---|---|---|---|---|---|---|---|---|---|---|---|---|---|---|---|---|---|---|---|
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 1 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 2 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 3 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 4 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 5 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 6 | D | S | U | U | U | D | S | U | U | D | D | S | U | U | U | D | S | U | U | D | D | S | U | U | U | D | S | U | U | D |

|  | frame 3 | | | | | | | | | | frame 4 | | | | | | | | | | frame 5 | | | | | | | | | |
|---|---|---|---|---|---|---|---|---|---|---|---|---|---|---|---|---|---|---|---|---|---|---|---|---|---|---|---|---|---|---|
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 1 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 2 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 3 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 4 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 5 | D | S | U | U | U | D | S | U | U | D | D | S | U | U | U | D | S | U | U | D | D | S | U | U | U | D | S | U | U | D |
|  | 0 | 1 | 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
| set 6 | D | S | U | U | U | D | S | U | U | D | D | S | U | U | U | D | S | U | U | D | D | S | U | U | U | D | S | U | U | D |

Fig 11

| frame n ||||||||||
|---|---|---|---|---|---|---|---|---|---|
| 0 | 1 | 2 | 3 | 4 | 5 | 6 | 7 | 8 | 9 |
| D | S | U | U | U | D | S | U | U | U |
| 0 | 1 | 2 | 3 | 4 | 5 | 6 | 7 | 8 | 9 |
| D | S | U | U | U | D | S | U | U | U |
| 0 | 1 | 2 | 3 | 4 | 5 | 6 | 7 | 8 | 9 |
| D | S | U | U | U | D | S | U | U | U |
| 0 | 1 | 2 | 3 | 4 | 5 | 6 | 7 | 8 | 9 |
| D | S | U | U | U | D | S | U | U | U |

| frame n | | | | | | | | | |
|---|---|---|---|---|---|---|---|---|---|
| 0 | 1 | 2 | 3 | 4 | 5 | 6 | 7 | 8 | 9 |
| D | S | U | U | D | D | S | U | U | D |
| 0 | 1 | 2 | 3 | 4 | 5 | 6 | 7 | 8 | 9 |
| D | S | U | U | D | D | S | U | U | D |
| 0 | 1 | 2 | 3 | 4 | 5 | 6 | 7 | 8 | 9 |
| D | S | U | U | D | D | S | U | U | D |
| 0 | 1 | 2 | 3 | 4 | 5 | 6 | 7 | 8 | 9 |
| D | S | U | U | D | D | S | U | U | D |
| 0 | 1 | 2 | 3 | 4 | 5 | 6 | 7 | 8 | 9 |
| D | S | U | U | D | D | S | U | U | D |
| 0 | 1 | 2 | 3 | 4 | 5 | 6 | 7 | 8 | 9 |
| D | S | U | U | D | D | S | U | U | D |
| 0 | 1 | 2 | 3 | 4 | 5 | 6 | 7 | 8 | 9 |
| D | S | U | U | D | D | S | U | U | D |
| 0 | 1 | 2 | 3 | 4 | 5 | 6 | 7 | 8 | 9 |
| D | S | U | U | D | D | S | U | U | D |

Fig 17

| frame n | | | | | | | | | |
|---|---|---|---|---|---|---|---|---|---|
| 0 | 1 | 2 | 3 | 4 | 5 | 6 | 7 | 8 | 9 |
| D | S | U | D | D | D | S | U | D | D |
| 0 | 1 | 2 | 3 | 4 | 5 | 6 | 7 | 8 | 9 |
| D | S | U | D | D | D | S | U | D | D |
| 0 | 1 | 2 | 3 | 4 | 5 | 6 | 7 | 8 | 9 |
| D | S | U | D | D | D | S | U | D | D |
| 0 | 1 | 2 | 3 | 4 | 5 | 6 | 7 | 8 | 9 |
| D | S | U | D | D | D | S | U | D | D |
| 0 | 1 | 2 | 3 | 4 | 5 | 6 | 7 | 8 | 9 |
| D | S | U | D | D | D | S | U | D | D |
| 0 | 1 | 2 | 3 | 4 | 5 | 6 | 7 | 8 | 9 |
| D | S | U | D | D | D | S | U | D | D |
| 0 | 1 | 2 | 3 | 4 | 5 | 6 | 7 | 8 | 9 |
| D | S | U | D | D | D | S | U | D | D |
| 0 | 1 | 2 | 3 | 4 | 5 | 6 | 7 | 8 | 9 |
| D | S | U | D | D | D | S | U | D | D |

Fig 18

| frame n | | | | | | | | | |
|---|---|---|---|---|---|---|---|---|---|
| 0 | 1 | 2 | 3 | 4 | 5 | 6 | 7 | 8 | 9 |
| D | S | U | U | U | D | D | D | D | D |
| 0 | 1 | 2 | 3 | 4 | 5 | 6 | 7 | 8 | 9 |
| D | S | U | U | U | D | D | D | D | D |
| 0 | 1 | 2 | 3 | 4 | 5 | 6 | 7 | 8 | 9 |
| D | S | U | U | U | D | D | D | D | D |
| 0 | 1 | 2 | 3 | 4 | 5 | 6 | 7 | 8 | 9 |
| D | S | U | U | U | D | D | D | D | D |
| 0 | 1 | 2 | 3 | 4 | 5 | 6 | 7 | 8 | 9 |
| D | S | U | U | U | D | D | D | D | D |
| 0 | 1 | 2 | 3 | 4 | 5 | 6 | 7 | 8 | 9 |
| D | S | U | U | U | D | D | D | D | D |
| 0 | 1 | 2 | 3 | 4 | 5 | 6 | 7 | 8 | 9 |
| D | S | U | U | U | D | D | D | D | D |
| 0 | 1 | 2 | 3 | 4 | 5 | 6 | 7 | 8 | 9 |
| D | S | U | U | U | D | D | D | D | D |

Fig 19

| frame n | | | | | | | | | |
|---|---|---|---|---|---|---|---|---|---|
| 0 | 1 | 2 | 3 | 4 | 5 | 6 | 7 | 8 | 9 |
| D | S | U | U | D | D | D | D | D | D |
| 0 | 1 | 2 | 3 | 4 | 5 | 6 | 7 | 8 | 9 |
| D | S | U | U | D | D | D | D | D | D |
| 0 | 1 | 2 | 3 | 4 | 5 | 6 | 7 | 8 | 9 |
| D | S | U | U | D | D | D | D | D | D |
| 0 | 1 | 2 | 3 | 4 | 5 | 6 | 7 | 8 | 9 |
| D | S | U | U | D | D | D | D | D | D |
| 0 | 1 | 2 | 3 | 4 | 5 | 6 | 7 | 8 | 9 |
| D | S | U | U | D | D | D | D | D | D |
| 0 | 1 | 2 | 3 | 4 | 5 | 6 | 7 | 8 | 9 |
| D | S | U | U | D | D | D | D | D | D |
| 0 | 1 | 2 | 3 | 4 | 5 | 6 | 7 | 8 | 9 |
| D | S | U | U | D | D | D | D | D | D |
| 0 | 1 | 2 | 3 | 4 | 5 | 6 | 7 | 8 | 9 |
| D | S | U | U | D | D | D | D | D | D |

Fig 20

METHOD FOR ALLOCATING RESOURCE OF WIRELESS COMMUNICATION AND CORRESPONDING USER DEVICE AND BASE STATION

CROSS-REFERENCE TO RELATED APPLICATIONS

This application is based upon PCT Application No. PCT/CN2010/077410, filed Sep. 28, 2010, now pending, the contents of which are wholly incorporated herein.

FIELD OF THE INVENTION

The present invention relates to the field of wireless communication technique, and more specifically, to a base station based on an Orthogonal Frequency Division Multiplexing (OFDM) scheme and a method of communication resource allocation therein the base station, a user equipment based on an OFDM scheme and a method of communication control therein.

BACKGROUND OF THE INVENTION

With rapid popularization of a user equipment such as a mobile phone, the user equipment is playing a more and more important role in people's life. Other functions besides communication in the user equipment are being more and more widely used, for example, accessing to Wireless Local Area Network (WLAN) with the user equipment. Moreover, interfaces such as infrared, BLUETOOTH, and Universal Serial Bus (USB) gradually become a standard configuration of the user equipment, in order to facilitate the communication link, data exchange and the like between the user equipment and other equipment. Particularly, the BLUETOOTH headset is becoming more and more widely used. Both the WLAN system and the BLUETOOTH system work at the Industry, Science and Medical (ISM) frequency band. For example, the frequency band 2400 MHz-2483.5 MHz is one of the international ISM frequency bands, and is also one of the ISM frequency bands used most frequently.

In a case in which the frequency band on which the communication between the user equipment and a base station is based is close to or a multiple of the frequency band on which the communication between the user equipment and other equipment is based, those two types of communications may interfere with each other. For example, the advanced Long Term Evolution (LTE) system in the wireless communication system is one of the system beyond 3G (beyond IMT-2000). According to the LTE standard series [36.101], the LTE system may work at several frequency bands. Among these LTE working frequency bands, some frequency bands are adjacent to the ISM frequency band, such as the frequency band 40 for deploying a LTE Time Division Duplexing (TDD) system, 2300 MHz-2400 MHz, and the frequency band 7 for deploying a LTE Frequency Division Duplexing (FDD) system, uplink 2500 MHz-2570 MHz, downlink 2620 MHz-2670 MHz. If a certain LTE user equipment works at the above frequency band while the WLAN system or the Bluetooth system in this user equipment is in an activated state, then due to adjacent frequency band leakage, the LTE system and the ISM system (WLAN system, the Bluetooth system and the like) which work in the adjacent frequency bands in this user equipment may interfere with each other, and may even fail to communicate because of too high a bit error rate.

A conventional approach to resolve this problem is to provide a transmission filter with higher performance both in the transmission side (such as the LTE system) for communication with the base station on the user equipment and in the transmission side (such as the ISM system) for communication with other equipment on the user equipment, so as to decrease the adjacent frequency band leakage as much as possible. The disadvantage of this approach is that the cost of the user equipment will be significantly increased.

SUMMARY OF THE INVENTION

One embodiment of the present invention is a base station for communicating with a user equipment in a time division duplexing manner based on an orthogonal frequency division multiplexing scheme. The physical transmission resources for the communication between the base station and the user equipment are divided into a plurality of consecutive frames in the time domain, each of the frames comprises a plurality of subframes. The base station may include a cycle determination device, a judgment device, and a communication control device. The cycle determination device may determine a cycle which a present frame belongs to, wherein the cycle consists of a predetermined number of frames of the plurality of frames. The judgment device may determine whether each of subframes of the present frame is marked as a first state or a second state different from the first state according to an allocation pattern, wherein the allocation pattern marks each subframe of each frame of the cycle as the first state or the second state. The communication control device may, in case of determining that the subframe is marked as the first state, enable the base station to communicate with the user equipment over the subframe, and in case of determining that the subframe is marked as the second state, disable the base station from performing the communication only relating to the user equipment over the subframe.

One embodiment of the present invention is a user equipment for communicating with a base station in a time division duplexing manner based on an orthogonal frequency division multiplexing scheme. The physical transmission resources for the communication between the base station and the user equipment are divided into a plurality of consecutive frames in the time domain, each of the frames comprises a plurality of subframes. The user equipment may include a first transceiver, a second transceiver, and a control device. The first transceiver may perform the communication with the base station. The second transceiver may perform another communication with at least one peripheral device based on another wireless communication scheme. The control device may control the first transceiver and the second transceiver according to an allocation pattern, wherein the plurality of frames are divided into cycles including a predetermined number of frames, and the allocation pattern marks each subframe of each frame of the cycles as a first state or a second state different from the first state. The control device may control the first transceiver to communicate with the base station over each subframe in case of determining that the subframe is marked as the first state, and control the second transceiver to perform the other communication with the at least one peripheral device in a time period corresponding to each subframe in case of determining that the subframe is marked as the second state and is not used by the user equipment for receiving system information.

One embodiment of the present invention is a method of communication resource allocation in a base station. The base station is adapted for communicating with a user equipment in a time division duplexing manner based on an orthogonal frequency division multiplexing scheme. The physical transmission resources for the communication between the base station and the user equipment are divided into a plurality of consecutive frames in the time domain, each of the frames comprises a plurality of subframes. According to this method, a cycle which a present frame belongs to may be determined, wherein the cycle consists of a predetermined number of frames of the plurality of frames. It may be determined whether each of subframes of the present frame is marked as a first state or a second state different from the first state according to an allocation pattern, wherein the allocation pattern marks each subframe of each frame of the cycle as the first state or the second state. In case of determining that the subframe is marked as the first state, the base station may be enabled to communicate with the user equipment over the subframe, and in case of determining that the subframe is marked as the second state, the base station may be disabled from performing the communication only relating to the user equipment over the subframe.

One embodiment of the present invention is a method of communication control in a user equipment. The user equipment communicates with a base station in a time division duplexing manner based on an orthogonal frequency division multiplexing scheme. The physical transmission resources for the communication between the base station and the user equipment are divided into a plurality of consecutive frames in the time domain, each of the frames comprises a plurality of subframes. According to this method, a first transceiver for the communication with the base station and a second transceiver for another communication with at least one peripheral device based on another wireless communication scheme may be controlled according to an allocation pattern. The plurality of frames are divided into cycles including a predetermined number of frames. The allocation pattern marks each subframe of each frame of the cycles as a first state or a second state different from the first state. The controlling may comprise controlling the first transceiver to communicate with the base station over each subframe in case of determining that the subframe is marked as the first state, and controlling the second transceiver to perform the other communication with the at least one peripheral device in a time period corresponding to each subframe in case of determining that the subframe is marked as the second state and is not used by the user equipment for receiving system information.

BRIEF DESCRIPTION OF THE DRAWINGS

Above and other objects, features and advantages will be more easily to be understood referring to the following descriptions made to the embodiments of the present invention in conjunction with the accompanying drawings. In the accompanying drawings, the same or corresponding reference numeral is adopted to denote the same or corresponding technical feature or component.

FIG. 4 shows uplink\downlink frame configurations 0 to 6 of a LTE TDD scheme;

FIG. 5 shows a location of a subframe in a frame structure, individually defined by respective sets in a first example;

FIG. 6 shows a location of a subframe in a frame structure, individually defined by respective sets in a second example;

FIG. 7 shows a location of a subframe in a frame structure, individually defined by respective sets in a third example;

FIG. 8 shows a location of a subframe in a frame structure, defined by respective sets in a fourth example;

FIG. 9 shows a location of a subframe in a frame structure, individually defined by respective sets in a fifth example;

FIG. 11 shows a location of a subframe in a frame structure, individually defined by respective sets in a seventh example;

FIG. 17 shows an example of an allocation pattern obtained under an uplink\downlink frame configuration 1 of a LTE TDD scheme;

FIG. 18 shows an example of an allocation pattern obtained under an uplink\downlink frame configuration 2 of a LTE TDD scheme;

FIG. 19 shows an example of an allocation pattern obtained under an uplink\downlink frame configuration 3 of a LTE TDD scheme;

FIG. 20 shows an example of an allocation pattern obtained under an uplink\downlink frame configuration 4 of a LTE TDD scheme;

DETAILED DESCRIPTION OF THE INVENTION

In the following, embodiments of the present will be described referring to the accompanying drawings. It should be noted that, for the sake of clarity, denotations and descriptions of components and processes that are irrelevant to the present invention and known to those skilled in the art will be omitted in the accompanying drawings and the description.

Figure 1:
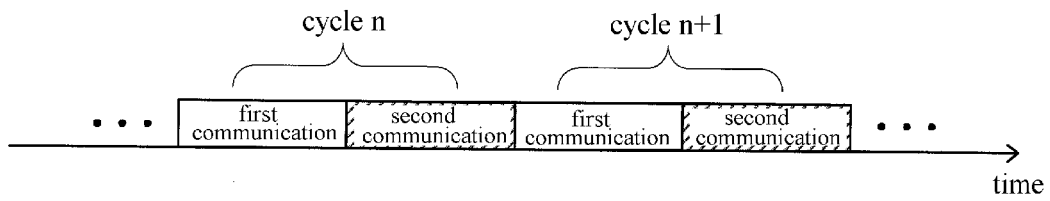
FIG. 1 is a schematic diagram showing the performing of a first communication between a user equipment and a base station and a second communication between a user equipment and other equipment in a time division multiplexing manner.

In the user equipment, two types of communications may be performed simultaneously, one is the communication between the user equipment and the base station (hereinafter, referred to as a first communication for convenience of the description), and the other is the communication between the user equipment and other equipment (such as BLUETOOTH headset) (hereinafter, referred to as a second communication for convenience of the description), and the frequency bands on which the first communication and the second communication are based are adjacent to each other. In such a case, due to adjacent frequency band leakage, there is a possibility that one of the first communication and the second communication interferes with the other, or the first communication and the second communication interfere with each other. The inventor recognizes that this interference may be avoided by performing the first communication and the second communication in a time division multiplexing manner. FIG. 1 is a schematic diagram showing the performing of a first communication and a second communication in a time division multiplexing manner. As shown in FIG. 1, in each of the cycles in time domain, the first communication and the second communication are performed alternately. Although each cycle includes two time periods for respectively performing the first communication and the second communication in FIG. 1, more than one time period for performing the first communication and\or the second communication may be included. The base station may allocate the subframe resource used by the first communication, wherein the first communication is enabled over the subframe corresponding to the time period for performing the first communication, and the first communication is disabled over the subframe corresponding to the time period for performing the second communication. In the user equipment, the communication control may be performed, wherein according to the channel resource allocation performed by the base station, the first communication is enabled over the subframe corresponding to the time period for performing the first communication, and the second communication is enabled over the subframe corresponding to the time period for performing the second communication.

Figure 2:
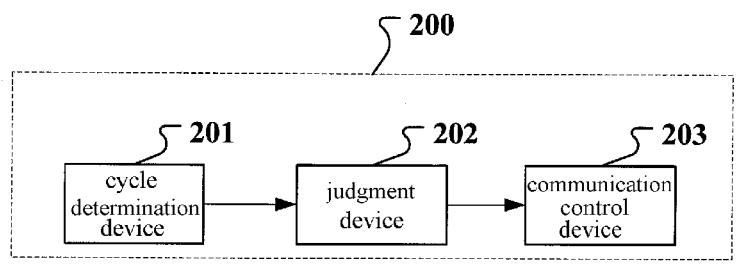
FIG. 2 is a block diagram showing an exemplary structure of a base station according to one embodiment of the present invention.

FIG. 2 is a block diagram showing an exemplary structure of a base station 200 according to one embodiment of the present invention. The base station 200 may communicate with the user equipment in a time division duplexing manner based on an OFDM scheme. The physical transmission resources for the communication between the base station and the user equipment may be divided into a plurality of consecutive frames in the time domain, each of the frames comprises a plurality of subframes.

As shown in FIG. 2, the base station 200 includes a cycle determination device 201, a judgment device 202 and a communication control device 203.

The cycle determination device 201 may determine a cycle which a present frame belongs to, wherein the cycle consists of a predetermined number of frames of the plurality of frames. The predetermined number may be the number of one or more than one as required in practical implement. In a case in which the predetermined number is more than one, the determining a cycle which a present frame belongs to also involves determining the location of the present frame in the cycle.

The judgment device 202 may determine whether each of subframes of the present frame is marked as a first state or a second state different from the first state according to an allocation pattern, wherein the allocation pattern marks each subframe of each frame of the cycle as the first state or the second state.

The communication control device 203 may, in case of determining that the subframe is marked as the first state, enable the base station to communicate with the user equipment over the subframe. The communication control device 203 may also, in case of determining that the subframe is marked as the second state, disable the base station from performing the communication only relating to the user equipment over the subframe. The communication only relating to the user equipment dose not include the broadcasting of the system information (such as the system information in the LTE TDD system) by the base station to all the user equipments. The communication control device 203 may implement this enabling and disabling by resource allocation.

Figure 3:
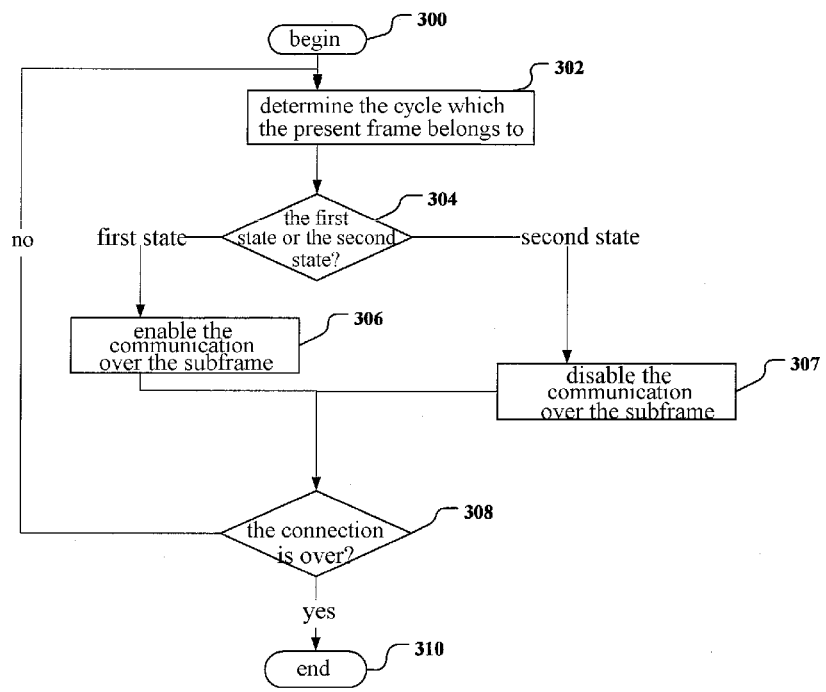
FIG. 3 is a flow chart showing an exemplary procedure of a method of communication resource allocation in a base station according to one embodiment of the present invention.

FIG. 3 is a flow chart showing an exemplary procedure of a method of communication resource allocation in a base station according to one embodiment of the present invention. The base station may communicate with the user equipment in a time division duplexing manner based on an OFDM scheme. The physical transmission resources for the communication between the base station and the user equipment may be divided into a plurality of consecutive frames in the time domain, each of the frames comprises a plurality of subframes.

As shown in FIG. 3, the method begins at step 300. At step 302, a cycle which a present frame belongs to is determined, wherein the cycle consists of a predetermined number of frames of the plurality of frames. The predetermined number may be the number of one or more than one as required in practical implement. In a case in which the predetermined number is more than one, the determining a cycle which a present frame belongs to also involves determining the location of the present frame in the cycle.

At step 304, it is determined whether each of subframes of the present frame is marked as a first state or a second state different from the first state according to an allocation pattern. The allocation pattern marks each subframe of each frame of the cycle as the first state or the second state. If it is determined at the step 304 that the subframe is marked as the first state, the base station is enabled to communicate with the user equipment over the subframe at step 306. Then the method proceeds to step 308. If it is determined at the step 304 that the subframe is marked as the second state, the base station is disabled from performing the communication only relating to the user equipment over the subframe at step 307. The communication only relating to the user equipment dose not include the broadcasting of the system information (such as the system information in the LTE TDD system) by the base station to all the user equipments. Then the method proceeds to step 308.

At the step 308, it is determined whether the connection between the base station and the user equipment is over. If the connection is not over, the method returns to the step 302 to continue processing, otherwise the method ends at step 310. With the time elapses, the corresponding present frame will change.

In the base station and the user equipment, a unified allocation pattern may be set statically. Alternatively, the user equipment may be notified by the base station of the adopted allocation pattern, for example when the user equipment is registered or the allocation pattern changes, as will be described in detail hereinafter.

The first communication may include the transmission and retransmission of the uplink data and the downlink data, exchanging of control signaling of various physical layers and high layers between the base station and the user equipment, and the like. The second communication is disabled during the first communication, and the first communication is disabled during the second communication, as will be described in detail hereinafter.

In order to maintain the normal working in the time division duplexing based on the OFDM scheme, besides the transmission of the uplink data and the downlink data, it is also necessary to transmit various uplink control information and downlink control information between the user equipment and the base station. Taking the LTE TDD system as an example, the control information may be for example the HARQ information, the CQI information, the configuration information from the base station for the user equipment to transmit the uplink data, the indication information from the base station for the user equipment to receive the downlink data, and the like. Here, the corresponding relation between the control information and the target subframe that corresponds to the control information is referred to as the control mapping relation.

In an embodiment of the base station and the method described in conjunction with FIG. 2 and FIG. 3, the usage of the subframe for the first communication may be defined as required, for example the uplink and downlink data, the uplink and downlink control information, the broadcasting information (such as the system information in the LTE TDD system), and the control mapping relation between the subframes.

In a further embodiment of the base station and the method described in conjunction with FIG. 2 and FIG. 3, the base station may be based on the LTE TDD scheme. According to the LTE TDD scheme, the frame may comply with one of uplink\downlink frame configurations 0 to 6. FIG. 4 shows uplink\downlink frame configurations 0 to 6 of the LTE TDD scheme. As shown in FIG. 4, each frame includes 10 subframes, i.e. subframe 0 to subframe 9. The subframe marked with a symbol "D" is the downlink subframe, the subframe marked with a symbol "U" is the uplink subframe, and the subframe marked with a symbol "S" is the subframe including a switch point.

The LTE TDD scheme specifies various control mapping relations between subframes. For example, for the data transmission of one uplink\downlink subframe, the uplink transmission of the control information relating thereto should be performed over the defined uplink\downlink subframe. The allocation pattern may be set that, if the time slot of one uplink subframe is allocated to be used by the first communication, it is ensured that the time slot of the subframe which has the control mapping relation with this uplink subframe, i.e. the subframe in which there are all the control information and the retransmission data related to this uplink subframe, should also be allocated to be used by the first communication. Thus the normal performing of this uplink transmission of the first communication is ensured. Similarly, if the time slot of one downlink subframe is allocated to be used by the first communication, then it is ensured that the time slot of the subframe which has the control mapping relation with this downlink subframe, i.e. the subframe in which there are all the control information related to this downlink subframe, should also be allocated to be used by the first communication.

In the first example, the number of the frame included in the cycle is one, each frame complies with uplink\downlink frame structure configuration 0 of the LTE TDD scheme. Furthermore, the allocation pattern marks at least the subframes defined by at least one of the following sets as the first state, and marks at least one portion of the remained subframes (may be any kind of one subframe to all the subframes) as the second state:
set 1={subframe 2, subframe 6},
set 2={subframe 1, subframe 7},
set 3={subframe 0, subframe 4},
set 4={subframe 5, subframe 9}.

Figures 15, 16:
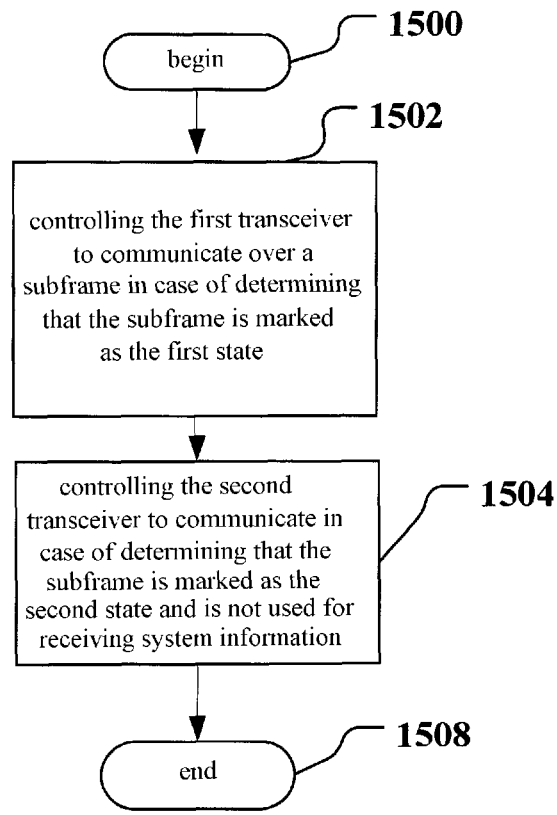
FIG. 15 is a flow chart showing an exemplary procedure of a method of communication control in a user equipment according to one embodiment of the present invention.
FIG. 16 shows an example of an allocation pattern obtained under an uplink\downlink frame configuration 0 of a LTE TDD scheme.

FIG. 5 shows a location of a subframe in a frame structure, individually defined by sets 1 to 4 in a first example, wherein the shadowed subframe is the subframe marked as the first state, and the unshadowed subframe is the other subframe. FIG. 16 shows an example of an allocation pattern obtained under an uplink\downlink frame configuration 0 of a LTE TDD scheme. In FIG. 16, each line represents one example, and the lines are numbered from up to down. The numbers 0 to 9 in the row are the subframe numbers, the blocks marked with the letter "D", "U" or "S" represent the subframe with the corresponding number, the shadowed subframe is the subframe marked as the first state, and the unshadowed subframe is the other subframe. The practical allocation pattern may mark one portion or all of the other subframes as the second state. The sets on which individual examples are based are listed in the following table.

| Example | Set combination |
| --- | --- |
| 1 | set 3 |
| 2 | set 3, set 4 |
| 3 | set 2, set 3, set 4 |
| 4 | set 1, set 2, set 3, set 4 |

In a second example, the number of the frame included in the cycle is one, and each frame complies with uplink\downlink frame structure configuration 1 of the LTE TDD scheme. Furthermore, the allocation pattern marks at least subframes defined by at least one of the following sets as the first state, and marks at least one portion of the remained subframes (may be any kind of one subframe to all the subframes) as the second state:
set 1={subframe 2, subframe 6},
set 2={subframe 2, subframe 5, subframe 6},
set 3={subframe 3, subframe 9},
set 4={subframe 1, subframe 7},
set 5={subframe 0, subframe 1, subframe 7},
set 6={subframe 4, subframe 8}.

FIG. 6 shows a location of a subframe in a frame structure, individually defined by sets 1 to 6 in the second example, wherein the shadowed subframe is the subframe marked as the first state, and the unshadowed subframe is the other subframe. FIG. 17 shows an example of an allocation pattern obtained under an uplink\downlink frame configuration 1 of the LTE TDD scheme. In FIG. 17, each line represents one example, and the lines are numbered from up to down. The numbers 0 to 9 in the row are the subframe numbers, the blocks marked with the letter "D", "U" or "S" represent the subframe with the corresponding number, the shadowed subframe is the subframe marked as the first state, and the unshadowed subframe is the other subframe. The practical allocation pattern may mark a portion or all of the other subframes as the second state. The sets on which individual examples are based are listed in the following table.

| Example | Set combination |
| --- | --- |
| 1 | set 3 |
| 2 | set 2 |
| 3 | set 3, set 6 |
| 4 | set 3, set 4, set 5 |
| 5 | set 2, set 5 |
| 6 | set 2, set 3, set 6 |
| 7 | set 2, set 3, set 5 |
| 8 | set 2, set 3, set 4, set 6 |

In a third example, the number of the frame included in the cycle is one, and each frame complies with uplink\downlink frame structure configuration 2 of the LTE TDD scheme. Furthermore, the allocation pattern marks at least subframes defined by at least one of the following sets as the first state, and marks at least one portion of the remained subframes (may be any kind of one subframe to all the subframes) as the second state:
set 1={subframe 2, subframe 8},
set 2={subframe 2, subframe 4, subframe 8},
set 3={subframe 2, subframe 5, subframe 8}, set 4={subframe 2, subframe 6, subframe 8},
set 5={subframe 3, subframe 7},
set 6={subframe 0, subframe 3, subframe 7},
set 7={subframe 1, subframe 3, subframe 7},
set 8={subframe 3, subframe 7, subframe 9}.

FIG. 7 shows a location of a subframe in a frame structure, individually defined by sets 1 to 8 in the third example, wherein the shadowed subframe is the subframe marked as the first state, and the unshadowed subframe is the other subframe. FIG. 18 shows an example of an allocation pattern obtained under an uplink\downlink frame configuration 2 of the LTE TDD scheme. In FIG. 18, each line represents one example, and the lines are numbered from up to down. The numbers 0 to 9 in the row are the subframe numbers, the blocks marked with the letter "D", "U" or "S" represent the subframe with the corresponding number, the shadowed subframe is the subframe marked as the first state, and the unshadowed subframe is the other subframe. The practical allocation pattern may mark a portion or all of the other subframes as the second state. The sets on which individual examples are based are listed in the following table.

| Example | Set combination |
|---|---|
| 1 | set 1 |
| 2 | set 8 |
| 3 | set 1, set 5 |
| 4 | set 1, set 8 |
| 5 | set 2, set 3, set 5 |
| 6 | set 2, set 3, set 8 |
| 7 | set 2, set 3, set 4, set 8 |
| 8 | set 2, set 3, set 4, set 5, set 6, set 8 |

In a fourth example, the number of the frame included in the cycle is one, and each frame complies with uplink\downlink frame structure configuration 3 of the LTE TDD scheme. Furthermore, the allocation pattern marks at least subframes defined by at least one of the following sets as the first state, and marks at least one portion of the remained subframes (may be any kind of one subframe to all the subframes) as the second state:
set 1={subframe 0, subframe 4},
set 2={subframe 0, subframe 4, subframe 9},
set 3={subframe 0, subframe 3, subframe 4, subframe 9},
set 4={subframe 0, subframe 3, subframe 4, subframe 7, subframe 9},
set 5={subframe 0, subframe 3, subframe 4, subframe 8, subframe 9},
set 6={subframe 0, subframe 2, subframe 3, subframe 4, subframe 8, subframe 9},
set 7={subframe 0, subframe 1, subframe 2, subframe 3, subframe 4, subframe 8, subframe 9},
set 8={subframe 0, subframe 2, subframe 3, subframe 4, subframe 5, subframe 8, subframe 9},
set 9={subframe 0, subframe 2, subframe 3, subframe 4, subframe 6, subframe 8, subframe 9}.

FIG. 8 shows a location of a subframe in a frame structure, individually defined by sets 1 to 9 in the fourth example, wherein the shadowed subframe is the subframe marked as the first state, and the unshadowed subframe is the other subframe. FIG. 19 shows an example of an allocation pattern obtained under an uplink\downlink frame configuration 3 of the LTE TDD scheme. In FIG. 19, each line represents one example, and the lines are numbered from up to down. The numbers 0 to 9 in the row are the subframe numbers, the blocks marked with the letter "D", "U" or "S" represent the subframe with the corresponding number, the shadowed subframe is the subframe marked as the first state, and the unshadowed subframe is the other subframe. The practical allocation pattern may mark a portion or all of the other subframes as the second state. The sets on which individual examples are based are listed in the following table.

| Example | Set combination |
|---|---|
| 1 | set 1 |
| 2 | set 2 |
| 3 | set 3 |
| 4 | set 5 |
| 5 | set 6 |
| 6 | set 8 |
| 7 | set 7 and set 8 |
| 8 | set 7, set 8, set 9 |

In a fifth example, the number of the frame included in the cycle is one, and each frame complies with uplink\downlink frame structure configuration 4 of the LTE TDD scheme. Furthermore, the allocation pattern marks at least subframes defined by at least one of the following sets as the first state, and marks at least one portion of the remained subframes (may be any kind of one subframe to all the subframes) as the second state:
set 1={subframe 3, subframe 9},
set 2={subframe 3, subframe 8, subframe 9},
set 3={subframe 3, subframe 7, subframe 9},
set 4={subframe 3, subframe 6, subframe 9},
set 5={subframe 2, subframe 3, subframe 8, subframe 9},
set 6={subframe 0, subframe 2, subframe 3, subframe 8, subframe 9},
set 7={subframe 1, subframe 2, subframe 3, subframe 8, subframe 9},
set 8={subframe 2, subframe 3, subframe 4, subframe 8, subframe 9},
set 9={subframe 2, subframe 3, subframe 5, subframe 8, subframe 9}.

FIG. 9 shows a location of a subframe in a frame structure, individually defined by sets 1 to 9 in the fifth example, wherein the shadowed subframe is the subframe marked as the first state, and the unshadowed subframe is the other subframe. FIG. 20 shows an example of an allocation pattern obtained under an uplink\downlink frame configuration 4 of the LTE TDD scheme. In FIG. 20, each line represents one example, and the lines are numbered from up to down. The numbers 0 to 9 in the row are the subframe numbers, the blocks marked with the letter "D", "U" or "S" represent the subframe with the corresponding number, the shadowed subframe is the subframes marked as the first state, and the unshadowed subframe is the other subframe. The practical allocation pattern may mark one portion or all of the other subframes as the second state. The sets on which individual examples are based are listed in the following table.

| Example | Set combination |
|---|---|
| 1 | set 1 |
| 2 | set 2 |
| 3 | set 5 |
| 4 | set 6 |
| 5 | set 3, set 6 |
| 6 | set 3, set 4, set 6 |
| 7 | set 3, set 4, set 5, set 6, set 9 |
| 8 | set 3, set 4, set 5, set 6, set 7, set 8 |

In a sixth example, the number of the frame included in the cycle is one, and each frame complies with uplink\downlink frame structure configuration 5 of the LTE TDD scheme. Furthermore, the allocation pattern marks at least subframes defined by at least one of the following sets as the first state, and marks at least one portion of the remained subframes (may be any kind of one subframe to all the subframes) as the second state:

set 1={subframe 2, subframe 8},
set 2={subframe 0, subframe 2, subframe 8},
set 3={subframe 1, subframe 2, subframe 8},
set 4={subframe 2, subframe 3, subframe 8},
set 5={subframe 2, subframe 4, subframe 8},
set 6={subframe 2, subframe 5, subframe 8},
set 7={subframe 2, subframe 6, subframe 8},
set 8={subframe 2, subframe 7, subframe 8},
set 9={subframe 2, subframe 8, subframe 9}.

Figures 10, 12:
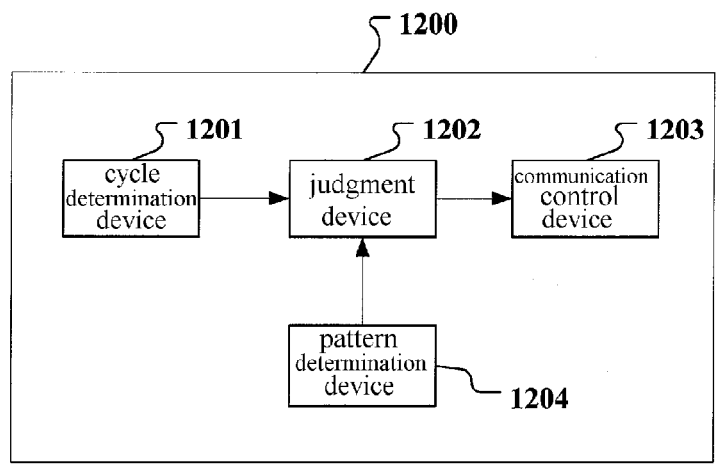
FIG. 10 shows a location of a subframe in a frame structure, individually defined by respective sets in a sixth example.
FIG. 12 is a block diagram showing an exemplary structure of a base station according to one embodiment of the present invention.
Figures 21, 22:
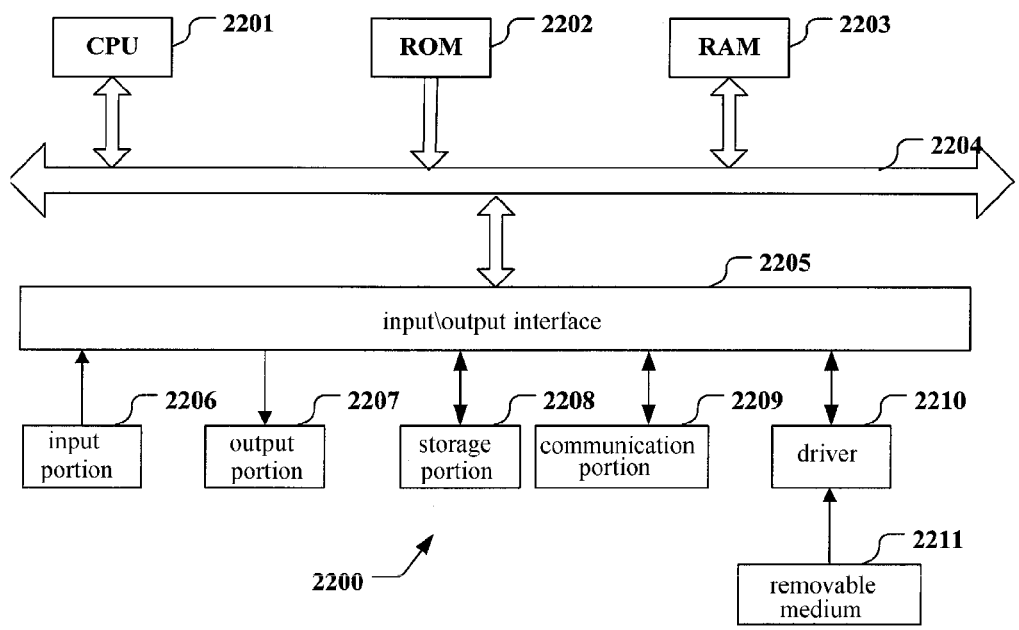
FIG. 21 shows an example of an allocation pattern obtained under an uplink\downlink frame configuration 5 of a LTE TDD scheme.
FIG. 22 is a block diagram of an exemplary structure of a computer in which an apparatus and a method of the present invention are implemented.

FIG. 10 shows a location of a subframe in a frame structure, individually defined by sets 1 to 9 in the sixth example, wherein the shadowed subframe is the subframe marked as the first state, and the unshadowed subframe is the other subframe. FIG. 21 shows an example of an allocation pattern obtained under an uplink\downlink frame configuration 5 of the LTE TDD scheme. In FIG. 21, each line represents one example, and the lines are numbered from up to down. The numbers 0 to 9 in the row are the subframe numbers, the blocks marked with the letter "D", "U" or "S" represent the subframe with the corresponding number, the shadowed subframe is the subframe marked as the first state, and the unshadowed subframe is the other subframe. The practical allocation pattern may mark one portion or all of the other subframes as the second state. The sets on which individual examples are based are listed in the following table.

| Example | Set combination |
|---------|-----------------|
| 1 | set 1 |
| 2 | set 2 |
| 3 | set 4, set 9 |
| 4 | set 4, set 5, set 9 |
| 5 | set 4, set 5, set 6, set 7 |
| 6 | set 4, set 5, set 6, set 7, set 8 |
| 7 | set 4, set 5, set 6, set 7, set 8, set 9 |
| 8 | set 3, set 4, set 5, set 6, set 7, set 8 |

In a seventh example, the number of the frames included in the cycle is six, and each frame complies with uplink\downlink frame structure configuration 6 of the LTE TDD scheme. Furthermore, the allocation pattern marks at least subframes defined by at least one of the following sets as the first state, and marks at least one portion of the remained subframes (may be any kind of one subframe to all the subframes) as the second state:

set 1={subframe 2 of frame 0, subframe 6 of frame 0, subframe 3 of frame 1, subframe 9 of frame 1, subframe 4 of frame 2, subframe 0 of frame 3, subframe 7 of frame 3, subframe 1 of frame 4, subframe 8 of frame 4, subframe 5 of frame 5}, set 2={subframe 3 of frame 0, subframe 9 of frame 0, subframe 4 of frame 1, subframe 0 of frame 2, subframe 7 of frame 2, subframe 1 of frame 3, subframe 8 of frame 3, subframe 5 of frame 4, subframe 2 of frame 5, subframe 6 of frame 5}, set 3={subframe 4 of frame 0, subframe 0 of frame 1, subframe 7 of frame 1, subframe 1 of frame 2, subframe 8 of frame 2, subframe 5 of frame 3, subframe 2 of frame 4, subframe 6 of frame 4, subframe 3 of frame 5, subframe 9 of frame 5}, set 4={subframe 0 of frame 0, subframe 7 of frame 0, subframe 1 of frame 1, subframe 8 of frame 1, subframe 5 of frame 2, subframe 2 of frame 3, subframe 6 of frame 3, subframe 3 of frame 4, subframe 9 of frame 4, subframe 4 of frame 5}, set 5={subframe 1 of frame 0, subframe 8 of frame 0, subframe 5 of frame 1, subframe 2 of frame 2, subframe 6 of frame 2, subframe 3 of frame 3, subframe 9 of frame 3, subframe 4 of frame 4, subframe 0 of frame 5, subframe 7 of frame 5}, set 6={subframe 5 of frame 0, subframe 2 of frame 1, subframe 6 of frame 1, subframe 3 of frame 2, subframe 9 of frame 2, subframe 4 of frame 3, subframe 0 of frame 4, subframe 7 of frame 4, subframe 1 of frame 5, subframe 8 of frame 5}.

FIG. 11 shows a location of a subframe in a frame structure, individually defined by sets 1 to 6 in the seventh example, wherein the shadowed subframe is the subframe marked as the first state, and the unshadowed subframe is the other subframe.

In the LTE TDD system, it is also necessary to broadcast the system information from the base station to the user equipment. The system information includes a Main Information Block (MIB) and a System Information Block (SIB). Generally, the MIB is broadcasted in the subframe 0, and the SIB is broadcasted in the subframe 5. According to the resource allocation of the system, the system information may be carried on the subframe that is marked as the first state (such as the subframe 0 and the subframe 5), or the system information is transmitted purely on the subframe that is marked as the second state.

The LTE TDD system has more complicated control mapping relation, which is caused by the multiple kinds of frame structures of the LTE TDD system.

Specifically, the control mapping relations to which the sets relate may include the following types:

1. the mapping relation between the downlink data and the uplink ACK\NACK signal corresponding to the downlink data;

2. the mapping relation between the uplink data and the downlink ACK\NACK signal corresponding to the uplink data;

3. the mapping relation between the downlink NACK signal and the uplink retransmission data corresponding to the downlink NACK signal;

4. the mapping relation between the downlink PDCCH for configuring the uplink data transmission and the uplink data transmission corresponding to the downlink PDCCH; and 5. the mapping relation between the downlink subframe for scheduling the non-periodic CQI information and the uplink subframe for transmitting this non-periodic CQI information.

Specifically, the above control mapping relations relate to the following tables in the LTE standard: the table 5.1.1.1-1, the table 8-2, the table 9.1.2-1 and the table 10.1-1 in the TS 36.213, wherein the table 5.1.1.1-1 gives the relation between the downlink subframe for transmitting the PDCCH format 0 and the uplink subframe scheduled by this PDCCH format 0, the table 8-2 gives the relation between the downlink subframe for receiving the downlink NACK relating to the uplink transmitted data and the uplink subframe for sending the corresponding retransmission, the table 9.1.2-1 gives the relation between the uplink subframe for sending the uplink data and the downlink subframe for receiving the HARQ information of the corresponding uplink data, and the table 10.1-1 gives the relation between the downlink subframe for receiving the data and the uplink subframe for transmitting the corresponding HARQ signal.

It should be noted that, the uplink\downlink frame structure configuration 0 has particularity, i.e., there are 6 uplink subframes and 4 downlink subframes (the subframe including the switch point is processed as the downlink subframe) in each frame. Therefore, in the control mapping relation of the uplink\downlink frame structure configuration 0, there are particular situations which do not comply with the control mapping relations given by the above tables. For example, if the uplink subframe 2 and the uplink subframe 3 in one frame are simultaneously scheduled to transmit uplink data, the base station may allocate both the uplink subframe 2 and the uplink subframe 3 in the same downlink subframe (the subframe 6 of the previous frame). If there are uplink transmissions over both the uplink subframe 3 and the uplink subframe 4 in one frame simultaneously, the base station may transmit the HARQ signals corresponding to both the uplink subframe 3 and the uplink subframe 4 in the same downlink subframe (the subframe 0 of the next frame). The relations among the subframes 7, 8 and 9 are similar to that among the subframes 2, 3 and 4.

Due to this particularity of the uplink\downlink frame structure configuration 0, the uplink\downlink frame structure configuration 0 can not find the set without changing the present control mapping relation as other configurations. The subframe 3 and the subframe 8 are fixedly not used for the first communication for simplifying the original control mapping relation.

Because the subframe 3 and the subframe 8 may not be used for the first communication, the case in which two uplink subframes commonly correspond to one downlink subframe will not occur. Therefore, the table 5.1.1.1-1, the table 8-2, the table 9.1.2-1, and the table 10.1-1 will be performed strictly, and no original particular case will occur.

It can be seen that, according to the allocation pattern described in conjunction with the FIG. 6 to FIG. 11, each set is defined based on the control mapping relation of the LTE TDD system within one cycle. Therefore, it is not necessary to modify the control mapping relation in the LTE TDD system. In the allocation pattern described in conjunction with FIG. 5, the subframe 3 and the subframe 8 will not be allocated for the first communication, so that the original control mapping relation in the LTE TDD system is simplified. In practical implement, the control mapping relations of the LTE TDD system from one cycle to another cycle should be the same. Therefore, the cycle should be one frame or integral times of one frame.

In one cycle, if a set consisting of several subframes in this cycle satisfies the following conditions, this set is referred to as a closed subframe set.

1. at least one uplink subframe and one downlink subframe are included in one set;

2. if one uplink transmission is scheduled by the base station over one uplink subframe in this set, the base station must allocate this uplink transmission over one downlink subframe in this set, and the base station must feed back the HARQ signal corresponding to this uplink transmission over one downlink subframe in this set; if this uplink transmission fails according to the HARQ signal from the base station, the corresponding uplink retransmission must also be performed over one uplink subframe in this set;

3. if one downlink transmission is received by the user equipment over one downlink subframe in this set, the user equipment must transmit the HARQ signal corresponding to this down transmission to the base station over one uplink subframe in this set; and 4. if the user equipment receives one scheduling command of the non-periodic CQI information form the base station over one downlink subframe in this set, the user equipment must transmit the scheduled CQI information over one uplink subframe in this set.

In the first example to the seventh example, each of the sets is a closed subframe set.

For each configuration, there are more than one set. One of these sets or any combination thereof may define a plurality of allocation patterns. Therefore, there are different allocation patterns to be selected.

FIG. 12 is a block diagram showing an exemplary structure of a base station 1200 according to one embodiment of the present invention.

As shown in FIG. 12, the base station 1200 includes a cycle determination device 1201, a judgment device 1202, a communication control device 1203 and a pattern determination device 1204. The cycle determination device 1201, the judgment device 1202 and the communication control device 1203 have respectively the same function as the cycle determination device 201, the judgment device 202 and the communication control device 203 in respective embodiments described above, which will not be described in detail here.

The allocation pattern is used to mark at least subframes defined by at least one of several sets as the first state, and to mark at least one portion of the remained subframes as the second state different from the first state. The pattern determination device 1204 is adapted for determining the allocation pattern by selecting the at least one set defining a lower number of subframes including a switch point in preference, or by selecting the at least one portion including a larger number of consecutive subframes in preference. The determined allocation pattern is provided to the judgment device 1202. The pattern determination device 1204 also notifies the user equipment of the determined allocation pattern.

Figure 13:
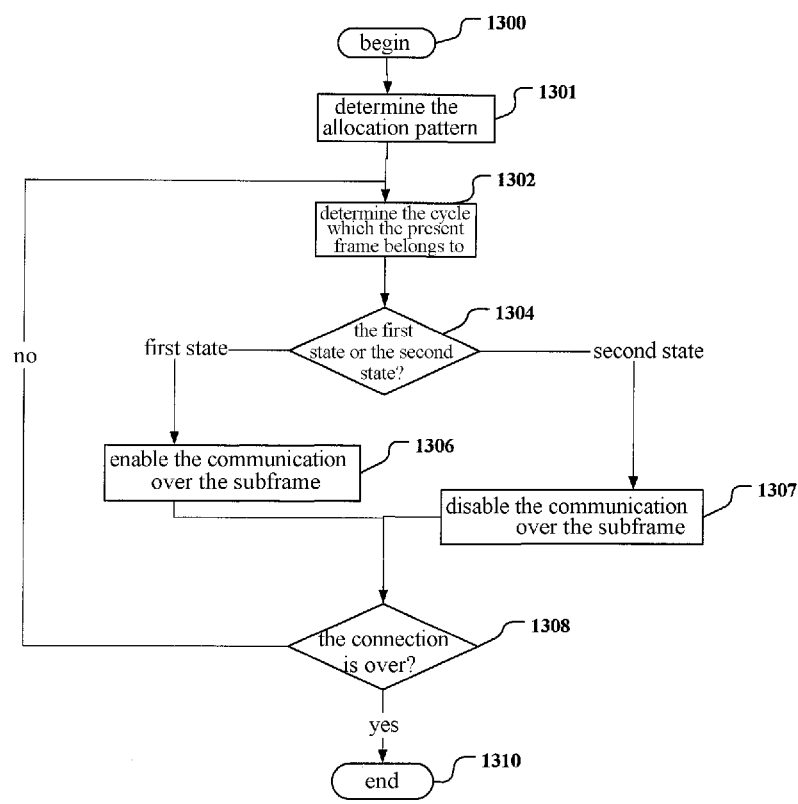
FIG. 13 is a flow chart showing an exemplary procedure of a method of communication resource allocation in a base station according to one embodiment of the present invention.

FIG. 13 is a flow chart showing an exemplary procedure of a method for communication resource allocation in a base station according to one embodiment of the present invention.

As shown in FIG. 13, the method begins from step 1300. At step 1301, the allocation pattern is determined. The allocation pattern is used to mark at least subframes defined by at least one of several sets as the first state, and to mark at least one portion of the remained subframes as the second state. The allocation pattern may be determined by selecting the at least one set defining a lower number of subframes including a switch point in preference, or by selecting the at least one portion including a larger number of consecutive subframes in preference. The determined allocation pattern is provided to be used by step 1304. Furthermore, in the step 1301, the user equipment is notified of the determined allocation pattern. The steps 1302, 1304, 1306, 1307, 1308 and 1310 have respectively the same processing as the steps 302, 304, 306, 307, 308 and 310, which will not be described in detail here.

Relative to the ordinary uplink and downlink subframe, the amount of the effective data in the subframe including the switch point is smaller. Therefore, it is enabled to improve the utilization of the subframe resource by determining the allocation pattern by selecting the at least one set defining a lower number of subframes including a switch point.

Furthermore, by preferably selecting to include at least one portion of more consecutive subframes, the number of switching between the first communication and the second communication in the user equipment and the number of switching between enabling the first communication and disabling the first communication in the base station can be decreased, and the continuity of the second communication is improved.

In the subframe configuration adopted by the base station, there are multiple possible allocation patterns. In different allocation patterns, the number of the subframe marked as the first state and the number of the subframe marked as the second state may be different in number and proportion. Accordingly, the bandwidth requirements of the first communication and the second communication that can be satisfied by the different allocation patterns are also different. Therefore, the allocation pattern having proper proportion may be adopted according to the requirement of the services for which the first communication and the second communication are used. Before the beginning of the first communication and the second communication, or when the services for which the first communication and the second communication are used change, the allocation pattern may be determined according to the requirement fed back by the user equipment.

In a further embodiment of the base station and the method for communication resource allocation in the base station described above, the pattern determination device may be further configured to select the allocation pattern that is able to meet a bandwidth requirement, according to the bandwidth requirement of the first communication and the second communication from the user equipment. The method may further include selecting the allocation pattern that is able to meet the bandwidth requirement, according to the bandwidth of the first communication and the second communication from the user equipment. The bandwidth requirement may be represented by the bandwidth required by the first communication and the second communication, the number or the proportion of the subframes for the first communication and the second communication in the cycle, or the like.

Furthermore, it should be understood that, in the time during which the first communication is disabled, the user equipment may perform the second communication with a plurality of peripheral devices, particularly perform the second communication with individual peripheral devices based on different wireless communication schemes. In such a case, the user equipment may include a second transceiver for the second communication with the corresponding peripheral device. The control device of the user equipment may allocate the corresponding time to the second communication between the second transceiver and the individual peripheral devices.

Figure 14:
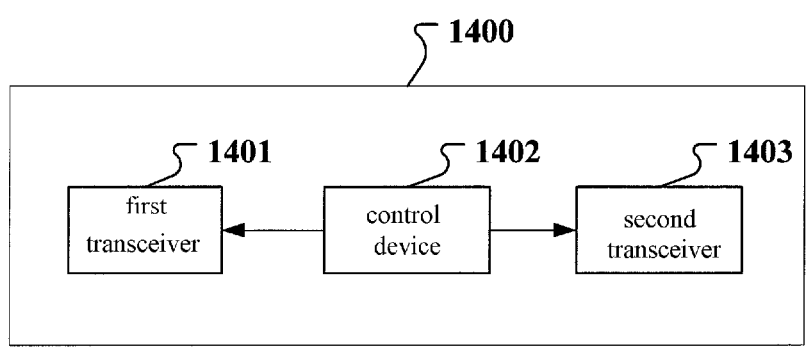
FIG. 14 is a block diagram showing an exemplary structure of a user equipment according to one embodiment of the present invention.

FIG. 14 is a block diagram showing an exemplary structure of a user equipment 1400 according to one embodiment of the present invention. The user equipment 1400 may communicate with the base station in the time division duplexing manner based on the OFDM scheme. The physical transmission resources for the communication between the base station and the user equipment are divided into a plurality of consecutive frames in the time domain, each of the frames comprises a plurality of subframes. Multiple frames are divided into cycles including predetermined number of frames. The allocation pattern as described above marks each subframe of each frame of the cycle as the first state or the second state different from the first state.

As shown in FIG. 14, the user equipment 1400 includes a first transceiver 1401, a control device 1402 and a second first transceiver 1403.

The first transceiver 1401 may perform communication with the base station, i.e. the first communication.

The second transceiver 1403 may perform another communication with at least one peripheral device based on another wireless communication scheme, i.e. the second communication.

The control device 1402 may control the first transceiver 1401 and the second transceiver 1403 according to an allocation pattern. The control device 1402 controls the first transceiver 1401 to perform the first communication over each subframe in case of determining that the subframe is marked as the first state, and controls the second transceiver 1403 to perform the second communication with at least one peripheral device in the time period corresponding to each subframe in case of determining that the subframe is marked as the second state and is not used by the user equipment for receiving system information. For certain subframe marked as the second state, the base station may broadcast system information over this subframe. However, it may be because of that the user equipment has already successfully receive the system information and thus does not need to receive the system information again over this subframe, the user equipment is able to use the time period corresponding to this subframe for the second communication.

FIG. 15 is a flow chart showing an exemplary procedure of a method for communication control in a user equipment according to one embodiment of the present invention. The user equipment may communicate with the base station in the time division duplexing manner based on the OFDM scheme. The physical transmission resources for the communication between the base station and the user equipment are divided into a plurality of consecutive frames in the time domain, each of the frames comprises a plurality of subframes. Multiple frames are divided into cycles including predetermined number of frames. The allocation pattern as described above marks each subframe of each frame of the cycle as the first state or the second state different from the first state.

As shown in FIG. 15, the method begins at step 1500. At step 1502, in case of determining that each subframe is marked as the first state, the first transceiver for the communication with the base station, i.e. a first communication, is controlled to perform the first communication over this subframe.

At step 1504, in case of determining that the subframe is marked as the second state and is not used by the user equipment for receiving system information, the second transceiver for performing other communication with at least one peripheral device according to other wireless communication scheme, i.e. the second communication, is controlled to perform the communication with the at least one peripheral device in the time corresponding to this subframe, i.e. to perform the second communication. For certain subframe marked as the second state, the base station may broadcast system information over this subframe. However, it may be because of that the user equipment has already successfully receive the system information and thus does not need to receive the system information again over this subframe, the user equipment is able to use the time corresponding to this subframe for the second communication.

And then the method ends at step 1506.

In a further embodiment of the user equipment and the method for communication control in the user equipment described in conjunction with FIG. 14 and FIG. 15, the user equipment is based on the LTE TDD scheme. Multiple frames of the physical transmission resources for the communication between the base station and the user equipment are divided into cycles including a predetermined number of frames. The allocation pattern may be the allocation pattern described referring to the first to the seventh example.

In the LTE TDD system, it is also necessary to broadcast the system information from the base station to the user equipment. The system information includes a Main Information Block (MIB) and a System Information Block (SIB). Generally, the MIB is broadcasted in the subframe 0, and the SIB is broadcasted in the subframe 5. The system information may be carried on the subframe that is marked as the first state (such as the subframe 0 and the subframe 5), or the system information is transmitted purely on the subframe that is marked as the second state.

In a further embodiment of the user equipment described above, the user equipment may further include a requesting device and a pattern receiving device. The requesting device may report a bandwidth requirement of the first communication and the second communication to the base station. Accordingly, the base station may determine the allocation pattern that meets a bandwidth requirement according to the bandwidth requirement of the first communication and the second communication, and send the information about the determined allocation pattern to the user equipment. The pattern receiving device may receive the information about the determined allocation pattern from the base station.

In a further embodiment of the method for communication control in the user equipment described above, the method may further include reporting a bandwidth requirement of the first communication and the second communication to the base station; and receiving, from the base station, the information about the allocation pattern that meets the bandwidth requirement and is determined by the base station.

Those skilled in the art should know that, the devices and the steps according to the embodiments of the present invention may be embodied as for example a system, a method or a computer program product. Therefore, the present invention may be specifically implemented in the following form, i.e., may be total hardware, total software (including firmware, resident software, micro code and the like), or the combination of the software portion and the hardware portion generally referred to as "circuit", "module" or "system" herein. Furthermore, the present invention may also be implemented in the form of computer program product that is embodied in any tangible medium of expression in which the program code available to the computer is included.

Any combination of one or more computer-readable medium may be used. The computer-readable medium may be the computer-readable signal medium or the computer-readable storage medium, and the computer-readable storage medium may be, but not limited to, for example electric, magnetic, optical, electromagnetic, infrared or semiconductor system, device, means or communication medium, or any suitable combination thereof. The more specific examples of the computer-readable storage medium may include (non-numerated list): electric connection with one or more wires, portable computer disk, hard disk, Random Access Memory (RAM), Read Only Memory (ROM), Erasable and Programmable Read Only Memory (EPROM or flash memory), optical fiber, portable Compact Disc-Read Only Memory (CD-ROM), optical storage device, magnetic storage device, or any suitable combination thereof. In the context of this document, the computer-readable storage medium may be any tangible medium that contains or stores the programs provided to be used by or relating to the system, device, and means of instruction execution.

The computer-readable signal medium may include for example the data signal carrying computer-readable program code, transmitted in the base band or as a portion of the carrier. Such a kind of transmission signal may take any suitable form, including but not limited to the electromagnetic, the optical, or any suitable combination thereof. The computer-readable signal medium may be any kind of computer-readable medium that is different from the computer-readable storage medium and may convey, propagate, or transmit the program provided to be used by or relating to the system, device, and means for instruction execution. The program code contained in the computer-readable medium may be transmitted by using any suitable medium, including but not limited to wireless, wired, optical fiber cable, radio frequency and the like, or any suitable combination thereof.

The computer program code for performing the operation of the present invention may be wrote in any combination of one or more programming languages, and the programming languages include the object-oriented programming language, such as Java, Smalltalk, C++ and the like, and may also include the conventional procedure programming language such as "C" programming language or the similar programming language. The program code may be executed completely on the computer of the user, partially on the computer of the user, as one independent software package, partially on the computer of the user and partially on the remote computer, or completely on the remote computer or the server. In the latter situation, the remote computer may be connected to the computer of the user through any kind of networks including the Local Area Network (LAN) or the Wide Area Network (WAN), or may be connected to the external computer (for example through the Internet by using the Internet service provider).

FIG. 22 is a schematic exemplary diagram of a computer in which an apparatus and a method of the present invention are implemented.

In the FIG. 22, the Central Processing Unit (CPU) 2201 executes various processing according to the program stored in the Read Only Memory (ROM) 2202 or the program loaded from the storage portion 2208 to the Random Access Memory (RAM) 2203. In the RAM 2203, the data required when the CPU 2201 executes various processing and the like are also stored as required.

The CPU 2201, the ROM 2202 and the RAM 2203 are connected to each other via the bus 2204. The input\output interface 2205 is also connected to the bus 2204.

The following components are connected to the input\output interface 2205: the input portion 2206, including a keyboard, a mouse, and the like; the output portion 2207, including the display such as a Cathode Ray Tube (CRT), the Liquid Crystal Display (LCD) and so on, the speaker and the like; the storage portion 2208, including the hard disk and the like; and the communication portion 2209, including network interface card such as LAN card, the modem and the like. The communication portion 2209 performs the communication processing via network such as Internet.

The driver 2210 is also connected to the input\output interface 2205 as required. The removable medium 2211 such as a magnetic disk, an optical disk, a magneto optical disk, the semiconductor mapping data and the like, may be mounted on the driver 2210 as required, so that the computer program read out therefrom is installed in the storage portion 2208 as required.

In a case in which the above steps and processes are implemented using software, the programs which consist the software is installed through a network such as Internet or a storage medium such as the removable medium 2211.

It should be understood by those skilled in the art that, this kind of storage medium is not limited to the removable medium 2211 in which the program is stored and which is distributed separately from the method so as to provide the user with the program, as shown in FIG. 22. The examples of the removable medium 2211 include magnetic disk, optical disk (including Compact Disk Read Only Memory (CD-ROM) and Digital Versatile Disc (DVD)), magnetic optical disk (including Mini-Disk (MD)), and semiconductor mapping data. Alternatively, the storage medium may be the hard disk contained in the ROM 2202 and the storage portion 2208 and the like, in which the programs are stored, and the programs are distributed to the user together with method containing the programs.

The equivalents or alternates of the corresponding structures, materials, operations and all the functionally defined means or the steps in the below claims are intended to include any structure, material or operation for performing this function in combination with the other units recited specifically in the claims. The purpose of the given description of the present invention is to illustrate and describe, but not to be exhaustive or limit the present invention to the described form. It is obvious for those skilled in the art to make many modifications and variations without deviating from the scope and the spirit of the present invention. The selection and the description of the embodiment are to explain the principle and the practical application of the present invention better, so that those skilled in that art may realize that the present invention may have various embodiments with various changes suitable for the required specific usage.

What is claimed is:

1. A base station for communicating with a user equipment in a time division duplexing manner based on an orthogonal frequency division multiplexing scheme, physical transmission resources for the communication between the base station and the user equipment being divided into a plurality of consecutive frames in the time domain, each of the frames comprising a plurality of subframes, and the base station comprising a processor and memory, wherein the processor comprises:
   a cycle determination device adapted to determine a cycle which a present frame belongs to, wherein the cycle consists of a predetermined number of frames of the plurality of frames;
   a judgment device adapted to determine whether each of subframes of the present frame is marked as a first state or a second state different from the first state according to an allocation pattern, wherein the allocation pattern marks each subframe of each frame of the cycle as the first state or the second state;
   a communication control device adapted to, in case of determining that the subframe is marked as the first state, enable the base station to communicate with the user equipment over the subframe, and in case of determining that the subframe is marked as the second state, disable the base station from performing the communication relating to the user equipment over the subframe; and
   a pattern determination device, adapted to determine an allocation pattern which can meet a bandwidth requirement on the communication and another communication with at least one peripheral device based on another wireless communication scheme,
   wherein the pattern determination device is further adapted to determine the allocation pattern by selecting at least one set defining fewer subframes including a switch point, or by selecting at least one portion including more consecutive subframes, and notifying the user equipment of the determined allocation pattern.

2. The base station according to claim 1, wherein the base station complies with the Long Term Evolution-Time Division Duplexing scheme for a wireless communication system, the predetermined number is one, each frame complies with uplink\downlink frame structure configuration 0, and
   the allocation pattern marks at least subframes defined by at least one of the following sets as the first state, and marks at least one portion of the remained subframes as the second state:
   {subframe 2, subframe 6},
   {subframe 1, subframe 7},
   {subframe 0, subframe 4},
   {subframe 5, subframe 9}.

3. The base station according to claim 1, wherein the base station complies with the Long Term Evolution-Time Division Duplexing scheme for a wireless communication system, the predetermined number is one, each frame complies with uplink\downlink frame structure configuration 1, and
   the allocation pattern marks at least subframes defined by at least one of the following sets as the first state, and marks at least one portion of the remained subframes as the second state:
   {subframe 2, subframe 6},
   {subframe 2, subframe 5, subframe 6},
   {subframe 3, subframe 9},
   {subframe 1, subframe 7},
   {subframe 0, subframe 1, subframe 7},
   {subframe 4, subframe 8}.

4. The base station according to claim 1, wherein the base station complies with the Long Term Evolution-Time Division Duplexing scheme for a wireless communication system, the predetermined number is one, each frame complies with uplink\downlink frame structure configuration 2, and
   the allocation pattern marks at least subframes defined by at least one of the following sets as the first state, and marks at least one portion of the remained subframes as the second state:
   {subframe 2, subframe 8},
   {subframe 2, subframe 4, subframe 8},
   {subframe 2, subframe 5, subframe 8},
   {subframe 2, subframe 6, subframe 8},
   {subframe 3, subframe 7},
   {subframe 0, subframe 3, subframe 7},
   {subframe 1, subframe 3, subframe 7},
   {subframe 3, subframe 7, subframe 9}.

5. The base station according to claim 1, wherein the base station complies with the Long Term Evolution-Time Division Duplexing scheme for a wireless communication system, the predetermined number is one, each frame complies with uplink\downlink frame structure configuration 3, and
   the allocation pattern marks at least subframes defined by at least one of the following sets as the first state, and marks at least one portion of the remained subframes as the second state:
   {subframe 0, subframe 4},
   {subframe 0, subframe 4, subframe 9},
   {subframe 0, subframe 3, subframe 4, subframe 9},
   {subframe 0, subframe 3, subframe 4, subframe 7, subframe 9},
   {subframe 0, subframe 3, subframe 4, subframe 8, subframe 9},
   {subframe 0, subframe 2, subframe 3, subframe 4, subframe 8, subframe 9},
   {subframe 0, subframe 1, subframe 2, subframe 3, subframe 4, subframe 8, subframe 9},
   {subframe 0, subframe 2, subframe 3, subframe 4, subframe 5, subframe 8, subframe 9},
   {subframe 0, subframe 2, subframe 3, subframe 4, subframe 6, subframe 8, subframe 9}.

6. The base station according to claim 1, wherein the base station complies with the Long Term Evolution-Time Division Duplexing scheme for a wireless communication system, the predetermined number is one, each frame complies with uplink\downlink frame structure configuration 4, and the allocation pattern marks at least subframes defined by at least one of the following sets as the first state, and marks at least one portion of the remained subframes as the second state:

{subframe 3, subframe 9},
{subframe 3, subframe 8, subframe 9},
{subframe 3, subframe 7, subframe 9},
{subframe 3, subframe 6, subframe 9},
{subframe 2, subframe 3, subframe 8, subframe 9},
{subframe 0, subframe 2, subframe 3, subframe 8, subframe 9},
{subframe 1, subframe 2, subframe 3, subframe 8, subframe 9},
{subframe 2, subframe 3, subframe 4, subframe 8, subframe 9},
{subframe 2, subframe 3, subframe 5, subframe 8, subframe 9}.

7. The base station according to claim 1, wherein the base station complies with the Long Term Evolution-Time Division Duplexing scheme for a wireless communication system, the predetermined number is one, each frame complies with uplink\downlink frame structure configuration 5, and
the allocation pattern marks at least subframes defined by at least one of the following sets as the first state, and marks at least one portion of the remained subframes as the second state:

{subframe 2, subframe 8},
{subframe 0, subframe 2, subframe 8},
{subframe 1, subframe 2, subframe 8},
{subframe 2, subframe 3, subframe 8},
{subframe 2, subframe 4, subframe 8},
{subframe 2, subframe 5, subframe 8},
{subframe 2, subframe 6, subframe 8},
{subframe 2, subframe 7, subframe 8},
{subframe 2, subframe 8, subframe 9}.

8. The base station according to claim 1, wherein the base station complies with the Long Term Evolution-Time Division Duplexing scheme for a wireless communication system, the predetermined number is six, six frames of each cycle comply with uplink\downlink frame structure configuration 6, and
the allocation pattern marks at least subframes defined by at least one of the following sets as the first state, and marks at least one portion of the remained subframes as the second state:

{subframe 2 of frame 0, subframe 6 of frame 0, subframe 3 of frame 1, subframe 9 of frame 1, subframe 4 of frame 2, subframe 0 of frame 3, subframe 7 of frame 3, subframe 1 of frame 4, subframe 8 of frame 4, subframe 5 of frame 5},
{subframe 3 of frame 0, subframe 9 of frame 0, subframe 4 of frame 1, subframe 0 of frame 2, subframe 7 of frame 2, subframe 1 of frame 3, subframe 8 of frame 3, subframe 5 of frame 4, subframe 2 of frame 5, subframe 6 of frame 5},
{subframe 4 of frame 0, subframe 0 of frame 1, subframe 7 of frame 1, subframe 1 of frame 2, subframe 8 of frame 2, subframe 5 of frame 3, subframe 2 of frame 4, sub-frame 6 of frame 4, subframe 3 of frame 5, subframe 9 of frame 5},
{subframe 0 of frame 0, subframe 7 of frame 0, subframe 1 of frame 1, subframe 8 of frame 1, subframe 5 of frame 2, subframe 2 of frame 3, subframe 6 of frame 3, subframe 3 of frame 4, subframe 9 of frame 4, subframe 4 of frame 5},
{subframe 1 of frame 0, subframe 8 of frame 0, subframe 5 of frame 1, subframe 2 of frame 2, subframe 6 of frame 2, subframe 3 of frame 3, subframe 9 of frame 3, subframe 4 of frame 4, subframe 0 of frame 5, subframe 7 of frame 5},
{subframe 5 of frame 0, subframe 2 of frame 1, subframe 6 of frame 1, subframe 3 of frame 2, subframe 9 of frame 2, subframe 4 of frame 3, subframe 0 of frame 4, subframe 7 of frame 4, subframe 1 of frame 5, subframe 8 of frame 5}.

9. A user equipment for communicating with a base station in a time division duplexing manner based on an orthogonal frequency division multiplexing scheme, physical transmission resources for the communication between the base station and the user equipment being divided into a plurality of consecutive frames in the time domain, each of the frames comprising a plurality of subframes, and the user equipment comprising a processor and memory, wherein the processor comprises:
a first transceiver adapted to communicate with the base station;
a second transceiver adapted to perform another communication with at least one peripheral device based on another wireless communication scheme;
a control device adapted to control the first transceiver and the second transceiver according to an allocation pattern, wherein the plurality of frames are divided into cycles including a predetermined number of frames, the allocation pattern marks each subframe of each frame of the cycles as a first state or a second state different from the first state, the control device controls the first transceiver to communicate with the base station over each subframe in case of determining that the subframe is marked as the first state, and controls the second transceiver to perform the other communication with the at least one peripheral device in a time period corresponding to each subframe in case of determining that the subframe is marked as the second state and is not used by the user equipment for receiving system information;
a requesting device adapted to report a bandwidth requirement of the communication and the other communication to the base station; and
a pattern receiving device adapted to receive information about the allocation pattern from the base station,
wherein the allocation pattern is determined by selecting at least one set defining fewer subframes including a switch point, or by selecting the at least one portion including more consecutive subframes.

10. The user equipment according to claim 9, wherein the user equipment complies with the Long Term Evolution-Time Division Duplexing scheme for a wireless communication system, the predetermined number is one,
wherein each frame complies with uplink\downlink frame structure configuration 0, and
the allocation pattern marks at least subframes defined by at least one of the following sets as the first state, and marks at least one portion of the remained subframes as the second state:

{subframe 2, subframe 6},
{subframe 1, subframe 7},
{subframe 0, subframe 4},
{subframe 5, subframe 9}.

11. The user equipment according to claim 9, wherein the user equipment complies with the Long Term Evolution-Time Division Duplexing scheme for a wireless communication system, the predetermined number is one,
wherein each frame complies with uplink\downlink frame structure configuration 1, and the allocation pattern marks at least subframes defined by at least one of the following sets as the first state, and marks at least one portion of the remained subframes as the second state:
{subframe 2, subframe 6},
{subframe 2, subframe 5, subframe 6},
{subframe 3, subframe 9},
{subframe 1, subframe 7},
{subframe 0, subframe 1, subframe 7}
{subframe 4, subframe 8}.

12. The user equipment according to claim 9, wherein the user equipment complies with the Long Term Evolution-Time Division Duplexing scheme for a wireless communication system, the predetermined number is one,
wherein each frame complies with uplink\downlink frame structure configuration 2, and
the allocation pattern marks at least subframes defined by at least one of the following sets as the first state, and marks at least one portion of the remained subframes as the second state:
{subframe 2, subframe 8},
{subframe 2, subframe 4, subframe 8},
{subframe 2, subframe 5, subframe 8},
{subframe 2, subframe 6, subframe 8},
{subframe 3, subframe 7},
{subframe 0, subframe 3, subframe 7},
{subframe 1, subframe 3, subframe 7},
{subframe 3, subframe 7, subframe 9}.

13. The user equipment according to claim 9, wherein the user equipment complies with the Long Term Evolution-Time Division Duplexing scheme for a wireless communication system, the predetermined number is one,
wherein each frame complies with uplink\downlink frame structure configuration 3, and
the allocation pattern marks at least subframes defined by at least one of the following sets as the first state, and marks at least one portion of the remained subframes as the second state:
{subframe 0, subframe 4},
{subframe 0, subframe 4, subframe 9},
{subframe 0, subframe 3, subframe 4, subframe 9},
{subframe 0, subframe 3, subframe 4, subframe 7, subframe 9},
{subframe 0, subframe 3, subframe 4, subframe 8, subframe 9},
{subframe 0, subframe 2, subframe 3, subframe 4, subframe 8, subframe 9},
{subframe 0, subframe 1, subframe 2, subframe 3, subframe 4, subframe 8, subframe 9},
{subframe 0, subframe 2, subframe 3, subframe 4, subframe 5, subframe 8, subframe 9},
{subframe 0, subframe 2, subframe 3, subframe 4, subframe 6, subframe 8, subframe 9}.

14. The user equipment according to claim 9, wherein the user equipment complies with the Long Term Evolution-Time Division Duplexing scheme for a wireless communication system, the predetermined number is one,
wherein each frame complies with uplink\downlink frame structure configuration 4, and
the allocation pattern marks at least subframes defined by at least one of the following sets as the first state, and marks at least one portion of the remained subframes as the second state:
{subframe 3, subframe 9},
{subframe 3, subframe 8, subframe 9},
{subframe 3, subframe 7, subframe 9},
{subframe 3, subframe 6, subframe 9},
{subframe 2, subframe 3, subframe 8, subframe 9},
{subframe 0, subframe 2, subframe 3, subframe 8, subframe 9},
{subframe 1, subframe 2, subframe 3, subframe 8, subframe 9},
{subframe 2, subframe 3, subframe 4, subframe 8, subframe 9},
{subframe 2, subframe 3, subframe 5, subframe 8, subframe 9}.

15. The user equipment according to claim 9, wherein the user equipment complies with the Long Term Evolution-Time Division Duplexing scheme for a wireless communication system, the predetermined number is one,
wherein each frame complies with uplink\downlink frame structure configuration 5, and
the allocation pattern marks at least subframes defined by at least one of the following sets as the first state, and marks at least one portion of the remained subframes as the second state:
{subframe 2, subframe 8},
{subframe 0, subframe 2, subframe 8},
{subframe 1, subframe 2, subframe 8},
{subframe 2, subframe 3, subframe 8},
{subframe 2, subframe 4, subframe 8},
{subframe 2, subframe 5, subframe 8},
{subframe 2, subframe 6, subframe 8},
{subframe 2, subframe 7, subframe 8},
{subframe 2, subframe 8, subframe 9}.

16. The user equipment according to claim 9, wherein the user equipment complies with the Long Term Evolution-Time Division Duplexing scheme for a wireless communication system, the predetermined number is six,
wherein six frames of each cycle comply with uplink\downlink frame structure configuration 6, and
the allocation pattern marks at least subframes defined by at least one of the following sets as the first state, and marks at least one portion of the remained subframes as the second state:
{subframe 2 of frame 0, subframe 6 of frame 0, subframe 3 of frame 1, subframe 9 of frame 1, subframe 4 of frame 2, subframe 0 of frame 3, subframe 7 of frame 3, subframe 1 of frame 4, subframe 8 of frame 4, subframe 5 of frame 5},
{subframe 3 of frame 0, subframe 9 of frame 0, subframe 4 of frame 1, subframe 0 of frame 2, subframe 7 of frame 2, subframe 1 of frame 3, subframe 8 of frame 3, subframe 5 of frame 4, subframe 2 of frame 5, subframe 6 of frame 5},
{subframe 4 of frame 0, subframe 0 of frame 1, subframe 7 of frame 1, subframe 1 of frame 2, subframe 8 of frame 2, subframe 5 of frame 3, subframe 2 of frame 4, subframe 6 of frame 4, subframe 3 of frame 5, subframe 9 of frame 5},
{subframe 0 of frame 0, subframe 7 of frame 0, subframe 1 of frame 1, subframe 8 of frame 1, subframe 5 of frame 2, subframe 2 of frame 3, subframe 6 of frame 3, subframe 3 of frame 4, subframe 9 of frame 4, subframe 4 of frame 5},
{subframe 1 of frame 0, subframe 8 of frame 0, subframe 5 of frame 1, subframe 2 of frame 2, subframe 6 of frame 2, subframe 3 of frame 3, subframe 9 of frame 3, subframe 4 of frame 4, subframe 0 of frame 5, subframe 7 of frame 5},
{subframe 5 of frame 0, subframe 2 of frame 1, subframe 6 of frame 1, subframe 3 of frame 2, subframe 9 of frame 2, subframe 4 of frame 3, subframe 0 of frame 4, subframe 7 of frame 4, subframe 1 of frame 5, subframe 8 of frame 5}.

17. A method for communication resource allocation in a base station for communicating with a user equipment in a time division duplexing manner based on an orthogonal frequency division multiplexing scheme, physical transmission resources for the communication between the base station and the user equipment being divided into a plurality of consecutive frames in the time domain, each of the frames comprising a plurality of subframes, and the method comprising:

determining a cycle which a present frame belongs to, wherein the cycle consists of a predetermined number of frames of the plurality of frames;

determining whether each of subframes of the present frame is marked as a first state or a second state different from the first state according to an allocation pattern, wherein the allocation pattern marks each subframe of each frame of the cycle as the first state or the second state;

in case of determining that the subframe is marked as the first state, enabling the base station to communicate with the user equipment over the subframe, and in case of determining that the subframe is marked as the second state, disabling the base station from performing the communication relating to the user equipment over the subframe;

selecting an allocation pattern which can meet a bandwidth requirement on the communication and another communication with at least one peripheral device based on another wireless communication scheme;

determining the allocation pattern by selecting at least one set defining fewer subframes including a switch point, or by selecting the at least one portion including more consecutive subframes; and notifying the user equipment of the determined allocation pattern.

18. The method according to claim 17, wherein the base station complies with the Long Term Evolution-Time Division Duplexing scheme for a wireless communication system, the predetermined number is one, each frame complies with uplink\downlink frame structure configuration 0, and
the allocation pattern marks at least subframes defined by at least one of the following sets as the first state, and marks at least one portion of the remained subframes as the second state:
{subframe 2, subframe 6},
{subframe 1, subframe 7},
{subframe 0, subframe 4},
{subframe 5, subframe 9}.

19. The method according to claim 17, wherein the base station complies with the Long Term Evolution-Time Division Duplexing scheme for a wireless communication system, the predetermined number is one, each frame complies with uplink\downlink frame structure configuration 1, and
the allocation pattern marks at least subframes defined by at least one of the following sets as the first state, and marks at least one portion of the remained subframes as the second state:
{subframe 2, subframe 6},
{subframe 2, subframe 5, subframe 6},
{subframe 3, subframe 9},
{subframe 1, subframe 7},
{subframe 0, subframe 1, subframe 7},
{subframe 4, subframe 8}.

20. The method according to claim 17, wherein the base station complies with the Long Term Evolution-Time Division Duplexing scheme for a wireless communication system, the predetermined number is one, each frame complies with uplink\downlink frame structure configuration 2, and
the allocation pattern marks at least subframes defined by at least one of the following sets as the first state, and marks at least one portion of the remained subframes as the second state:
{subframe 2, subframe 8},
{subframe 2, subframe 4, subframe 8},
{subframe 2, subframe 5, subframe 8},
{subframe 2, subframe 6, subframe 8},
{subframe 3, subframe 7},
{subframe 0, subframe 3, subframe 7},
{subframe 1, subframe 3, subframe 7},
{subframe 3, subframe 7, subframe 9}.

21. The method according to claim 17, wherein the base station complies with the Long Term Evolution-Time Division Duplexing scheme for a wireless communication system, the predetermined number is one, each frame complies with uplink\downlink frame structure configuration 3, and
the allocation pattern marks at least subframes defined by at least one of the following sets as the first state, and marks at least one portion of the remained subframes as the second state:
{subframe 0, subframe 4},
{subframe 0, subframe 4, subframe 9},
{subframe 0, subframe 3, subframe 4, subframe 9},
{subframe 0, subframe 3, subframe 4, subframe 7, subframe 9},
{subframe 0, subframe 3, subframe 4, subframe 8, subframe 9},
{subframe 0, subframe 2, subframe 3, subframe 4, subframe 8, subframe 9},
{subframe 0, subframe 1, subframe 2, subframe 3, subframe 4, subframe 8, subframe 9},
{subframe 0, subframe 2, subframe 3, subframe 4, subframe 5, subframe 8, subframe 9},
{subframe 0, subframe 2, subframe 3, subframe 4, subframe 6, subframe 8, subframe 9}.

22. The method according to claim 17, wherein the base station complies with the Long Term Evolution-Time Division Duplexing scheme for a wireless communication system, the predetermined number is one, each frame complies with uplink\downlink frame structure configuration 4, and
the allocation pattern marks at least subframes defined by at least one of the following sets as the first state, and marks at least one portion of the remained subframes as the second state:
{subframe 3, subframe 9},
{subframe 3, subframe 8, subframe 9},
{subframe 3, subframe 7, subframe 9},
{subframe 3, subframe 6, subframe 9},
{subframe 2, subframe 3, subframe 8, subframe 9},
{subframe 0, subframe 2, subframe 3, subframe 8, subframe 9},
{subframe 1, subframe 2, subframe 3, subframe 8, subframe 9},
{subframe 2, subframe 3, subframe 4, subframe 8, subframe 9},
{subframe 2, subframe 3, subframe 5, subframe 8, subframe 9}.

23. The method according to claim 17, wherein the base station complies with the Long Term Evolution-Time Division Duplexing scheme for a wireless communication system, the predetermined number is one, each frame complies with uplink\downlink frame structure configuration 5, and the allocation pattern marks at least subframes defined by at least one of the following sets as the first state, and marks at least one portion of the remained subframes as the second state:
{subframe 2, subframe 8},
{subframe 0, subframe 2, subframe 8},
{subframe 1, subframe 2, subframe 8},
{subframe 2, subframe 3, subframe 8},
{subframe 2, subframe 4, subframe 8},
{subframe 2, subframe 5, subframe 8},
{subframe 2, subframe 6, subframe 8},
{subframe 2, subframe 7, subframe 8},
{subframe 2, subframe 8, subframe 9}.

24. The method according to claim 17, wherein the base station complies with the Long Term Evolution-Time Division Duplexing scheme for a wireless communication system, the predetermined number is six, six frames of each cycle comply with uplink\downlink frame structure configuration 6, and the allocation pattern marks at least subframes defined by at least one of the following sets as the first state, and marks at least one portion of the remained subframes as the second state:
{subframe 2 of frame 0, subframe 6 of frame 0, subframe 3 of frame 1, subframe 9 of frame 1, subframe 4 of frame 2, subframe 0 of frame 3, subframe 7 of frame 3, subframe 1 of frame 4, subframe 8 of frame 4, subframe 5 of frame 5},
{subframe 3 of frame 0, subframe 9 of frame 0, subframe 4 of frame 1, subframe 0 of frame 2, subframe 7 of frame 2, subframe 1 of frame 3, subframe 8 of frame 3, subframe 5 of frame 4, subframe 2 of frame 5, subframe 6 of frame 5},
{subframe 4 of frame 0, subframe 0 of frame 1, subframe 7 of frame 1, subframe 1 of frame 2, subframe 8 of frame 2, subframe 5 of frame 3, subframe 2 of frame 4, subframe 6 of frame 4, subframe 3 of frame 5, subframe 9 of frame 5},
{subframe 0 of frame 0, subframe 7 of frame 0, subframe 1 of frame 1, subframe 8 of frame 1, subframe 5 of frame 2, subframe 2 of frame 3, subframe 6 of frame 3, subframe 3 of frame 4, subframe 9 of frame 4, subframe 4 of frame 5},
{subframe 1 of frame 0, subframe 8 of frame 0, subframe 5 of frame 1, subframe 2 of frame 2, subframe 6 of frame 2, subframe 3 of frame 3, subframe 9 of frame 3, subframe 4 of frame 4, subframe 0 of frame 5, subframe 7 of frame 5},
{subframe 5 of frame 0, subframe 2 of frame 1, subframe 6 of frame 1, subframe 3 of frame 2, subframe 9 of frame 2, subframe 4 of frame 3, subframe 0 of frame 4, subframe 7 of frame 4, subframe 1 of frame 5, subframe 8 of frame 5}.

25. A method for communication control in a user equipment for communicating with a base station in a time division duplexing manner based on an orthogonal frequency division multiplexing scheme, physical transmission resources for the communication between the base station and the user equipment being divided into a plurality of consecutive frames in the time domain, each of the frames comprising a plurality of subframes, and the method comprising:

controlling a first transceiver for the communication with the base station and a second transceiver for another communication with at least one peripheral device based on another wireless communication scheme, according to an allocation pattern, wherein the plurality of frames are divided into cycles including a predetermined number of frames, the allocation pattern marks each subframe of each frame of the cycles as a first state or a second state different from the first state, wherein the controlling comprises controlling the first transceiver to communicate with the base station over each subframe in case of determining that the subframe is marked as the first state, and controlling the second transceiver to perform the other communication with the at least one peripheral device in a time period corresponding to each subframe in case of determining that the subframe is marked as the second state and is not used by the user equipment for receiving system information;

reporting a bandwidth requirement of the communication and the other communication to the base station; and receiving information about the allocation pattern from the base station, wherein the allocation pattern is determined by selecting at least one set defining fewer subframes including a switch point, or by selecting at least one portion including more consecutive subframes.

26. The method according to claim 25, wherein the user equipment complies with the Long Term Evolution-Time Division Duplexing scheme for a wireless communication system, the predetermined number is one, wherein each frame complies with uplink\downlink frame structure configuration 0, and the allocation pattern marks at least subframes defined by at least one of the following sets as the first state, and marks at least one portion of the remained subframes as the second state:
{subframe 2, subframe 6},
{subframe 1, subframe 7},
{subframe 0, subframe 4},
{subframe 5, subframe 9}.

27. The method according to claim 25, wherein the equipment complies with the Long Term Evolution-Time Duplexing scheme for a wireless communication system, the predetermined number is one, wherein each frame complies with a uplink\downlink structure configuration 1, and the allocation pattern marks at least subframes defined by at least one of the following sets as the first state, and marks at least one portion of the remained subframes as the second state:
{subframe 2, subframe 6},
{subframe 2, subframe 5, subframe 6},
{subframe 3, subframe 9},
{subframe 1, subframe 7},
{subframe 0, subframe 1, subframe 7},
{subframe 4, subframe 8}.

28. The method according to claim 25, wherein the user equipment complies with the Long Term Evolution-Time Duplexing scheme for a wireless communication system, the predetermined number is one, wherein each frame complies with a uplink\downlink structure configuration 2, and the allocation pattern marks at least subframes defined by at least one of the following sets as the first state, and marks at least one portion of the remained subframes as the second state:
{subframe 2, subframe 8},
{subframe 2, subframe 4, subframe 8},
{subframe 2, subframe 5, subframe 8},
{subframe 2, subframe 6, subframe 8}, {subframe 3, subframe 7},
{subframe 0, subframe 3, subframe 7},
{subframe 1, subframe 3, subframe 7},
{subframe 3, subframe 7, subframe 9}.

29. The method according to claim 25, wherein the user equipment complies with the Long Term Evolution-Time Division Duplexing scheme for a wireless communication system, the predetermined number is one,
   wherein each frame complies with uplink\downlink structure configuration 3, and
   the allocation pattern marks at least subframes defined by at least one of the following sets as the first state, and marks at least one portion of the remained subframes as the second state:
{subframe 0, subframe 4},
{subframe 0, subframe 4, subframe 9},
{subframe 0, subframe 3, subframe 4, subframe 9},
{subframe 0, subframe 3, subframe 4, subframe 7, subframe 9},
{subframe 0, subframe 3, subframe 4, subframe 8, subframe 9},
{subframe 0, subframe 2, subframe 3, subframe 4, subframe 8, subframe 9},
{subframe 0, subframe 1, subframe 2, subframe 3, subframe 4, subframe 8, subframe 9},
{subframe 0, subframe 2, subframe 3, subframe 4, subframe 5, subframe 8, subframe 9},
{subframe 0, subframe 2, subframe 3, subframe 4, subframe 6, subframe 8, subframe 9}.

30. The method according to claim 25, wherein the user equipment complies with the Long Term Evolution-Time Division Duplexing scheme for a wireless communication system, the predetermined number is one,
   wherein each frame complies with uplink\downlink structure configuration 4, and
   the allocation pattern marks at least subframes defined by at least one of the following sets as the first state, and marks at least one portion of the remained subframes as the second state:
{subframe 3, subframe 9},
{subframe 3, subframe 8, subframe 9},
{subframe 3, subframe 7, subframe 9},
{subframe 3, subframe 6, subframe 9},
{subframe 2, subframe 3, subframe 8, subframe 9},
{subframe 0, subframe 2, subframe 3, subframe 8, subframe 9},
{subframe 1, subframe 2, subframe 3, subframe 8, subframe 9},
{subframe 2, subframe 3, subframe 4, subframe 8, subframe 9},
{subframe 2, subframe 3, subframe 5, subframe 8, subframe 9}.

31. The method according to claim 25, wherein the user equipment complies with the Long Term Evolution-Time Division Duplexing scheme for a wireless communication system, the predetermined number is one,
   wherein each frame complies with uplink\downlink structure configuration 5, and
   the allocation pattern marks at least subframes defined by at least one of the following sets as the first state, and marks at least one portion of the remained subframes as the second state:
{subframe 2, subframe 8},
{subframe 0, subframe 2, subframe 8},
{subframe 1, subframe 2, subframe 8},
{subframe 2, subframe 3, subframe 8},
{subframe 2, subframe 4, subframe 8},
{subframe 2, subframe 5, subframe 8},
{subframe 2, subframe 6, subframe 8},
{subframe 2, subframe 7, subframe 8},
{subframe 2, subframe 8, subframe 9}.

32. The method according to claim 25, wherein the user equipment complies with the Long Term Evolution-Time Division Duplexing scheme for a wireless communication system, the predetermined number is six,
   wherein six frames of each cycle comply with uplink\downlink frame structure configuration 6, and
   the allocation pattern marks at least subframes defined by at least one of the following sets as the first state, and marks at least one portion of the remained subframes as the second state:
{subframe 2 of frame 0, subframe 6 of frame 0, subframe 3 of frame 1, subframe 9 of frame 1, subframe 4 of frame 2, subframe 0 of frame 3, subframe 7 of frame 3, subframe 1 of frame 4, subframe 8 of frame 4, subframe 5 of frame 5},
{subframe 3 of frame 0, subframe 9 of frame 0, subframe 4 of frame 1, subframe 0 of frame 2, subframe 7 of frame 2, subframe 1 of frame 3, subframe 8 of frame 3, subframe 5 of frame 4, subframe 2 of frame 5, subframe 6 of frame 5},
{subframe 4 of frame 0, subframe 0 of frame 1, subframe 7 of frame 1, subframe 1 of frame 2, subframe 8 of frame 2, subframe 5 of frame 3, subframe 2 of frame 4, subframe 6 of frame 4, subframe 3 of frame 5, subframe 9 of frame 5},
{subframe 0 of frame 0, subframe 7 of frame 0, subframe 1 of frame 1, subframe 8 of frame 1, subframe 5 of frame 2, subframe 2 of frame 3, subframe 6 of frame 3, subframe 3 of frame 4, subframe 9 of frame 4, subframe 4 of frame 5},
{subframe 1 of frame 0, subframe 8 of frame 0, subframe 5 of frame 1, subframe 2 of frame 2, subframe 6 of frame 2, subframe 3 of frame 3, subframe 9 of frame 3, subframe 4 of frame 4, subframe 0 of frame 5, subframe 7 of frame 5},
{subframe 5 of frame 0, subframe 2 of frame 1, subframe 6 of frame 1, subframe 3 of frame 2, subframe 9 of frame 2, subframe 4 of frame 3, subframe 0 of frame 4, subframe 7 of frame 4, subframe 1 of frame 5, subframe 8 of frame 5}.

* * * * *